(12) United States Patent
Yashima et al.

(10) Patent No.: US 9,656,878 B2
(45) Date of Patent: May 23, 2017

(54) PEROVSKITE RELATED COMPOUND

(71) Applicants: Tokyo Institute of Technology, Tokyo (JP); Daiichi Kigenso Kagaku Kogyo Co., Ltd., Osaka (JP)

(72) Inventors: Masatomo Yashima, Kanagawa (JP); Kotaro Fujii, Kanagawa (JP); Kazuki Omoto, Tokyo (JP); Yuichi Esaki, Tokyo (JP); Chihiro Saito, Kanagawa (JP)

(73) Assignees: Tokyo Institute of Technology, Tokyo (JP); Daiichi Kigenso Kagaku Kogyo Co., Ltd., Osaka (JP)

( * ) Notice: Subject to any disclaimer, the term of this patent is extended or adjusted under 35 U.S.C. 154(b) by 184 days.

(21) Appl. No.: 14/326,909

(22) Filed: Jul. 9, 2014

(65) Prior Publication Data
US 2015/0060743 A1 Mar. 5, 2015

(30) Foreign Application Priority Data

Aug. 27, 2013 (JP) .................................. 2013-175611
Jan. 21, 2014 (JP) .................................. 2014-008192

(51) Int. Cl.
*H01B 1/08* (2006.01)
*C01G 15/00* (2006.01)

(52) U.S. Cl.
CPC ............. *C01G 15/006* (2013.01); *H01B 1/08* (2013.01); *C01P 2002/34* (2013.01);
(Continued)

(58) Field of Classification Search
CPC ....... H01B 1/00; H01B 1/08; H01L 21/31691; C04B 2235/761; C04B 2235/768
See application file for complete search history.

(56) References Cited

PUBLICATIONS

Titov et al "Synthesis and crystal structure of BaLaInO4 and SrLnInO4 (Ln is La or Pr)", Dopovidi Natsional'noi Akademii Nauk Ukraini (2009), (10), 160-166 (Abstract Only).*

(Continued)

*Primary Examiner* — Mark Kopec
(74) *Attorney, Agent, or Firm* — Seyfarth Shaw LLP

(57) ABSTRACT

Perovskite related compound of the present invention have layered structures in which perovskite units and A-rare earth structure units are alternately arranged. The reduced cell parameters $a_r$-$c_r$ and $\alpha_r$-$\gamma_r$ and the reduced cell volume $V_r$ are within the following ranges: $a_r$=6.05±0.6 Å, $b_r$=8.26±0.8 Å, $c_r$=9.10±0.9 Å, $\alpha_r$=103.4±10°, $\beta_r$=90±10°, $\gamma_r$=90±10°, and $V_r$=442.37±67 Å$^3$. At least one of the reduced cell parameters $a_r$-$c_r$ can be m/n times as large as the aforementioned values, where m and n are independent natural numbers, the square roots of 2 or 3 or integral multiples thereof. Values of $a_r$, $b_r$ and $c_r$ can be replaced with one another, or values of $\alpha_r$, $\beta_r$ and $\gamma_r$ can be replaced with one another.

7 Claims, 32 Drawing Sheets

EXAMPLE 1-1 NdBaInO$_4$

(52) U.S. Cl.
CPC ...... *C01P 2002/72* (2013.01); *C01P 2002/76* (2013.01); *C01P 2002/77* (2013.01)

(56) References Cited

PUBLICATIONS

Kato et al "Synthesis and properties of In-containing layered perovskie-type oxides", Proceedings of the International Conference on Materials Engineering for Resources, 4th, Akita, Japan, Oct. 11-13, 2001, vol. 2, 107-108 (Abstract Only).*
Lavat et al "IR-spectoscopic behavior of AA'BO4 oxides . . . ", Journal of Alloys and Compounds 368 (2004) 130-134.*
Fujii et al "Improved oxide-ion conductivity of NdBaInO4 by Sr doping", Journal of Materials Chemistry A, 2015, 3, 11985-90.*
Titov et al "Synthesis and crystal structure of BaLaInO4 and SrLnInO4 (Ln is La or Pr)", Dopovidi Natsional'noi Akademii Nauk Ukraini (2009), (10), 160-166.*
Kato et al "Synthesis and properties of In-containing layered perovskie-type oxides", Proceedings of the International Conference on Materials Engineering for Resources, 4th, Akita, Japan, Oct. 11-13, 2001, vol. 2, 107-108.*
Titov et al "Synthesis and crystal structure of BaLaInO4 and SrLnInO4 (Ln is La or Pr)", Dopovidi Natsional'noi Akademii Nauk Ukraini (2009), (10), 160-166 (English language translation).*
Mitchell et al "Structural phase diagram of La1-xSrxMnO3+gamma: Relationship to magnetic and transport properties." Physical Review B vol. 54, No. 9, 6172-83 (1996).*
Cochrane et al "NdBaScO4: aristotype of a new family of geometric ferroelectrics" ChemComm 2016 (DOI:10.1039/c6cc05940f).*
The Crystallographic Society of Japan, Oct. 25, 2012, Abstract Book, 25-PB-01.
The Ceramic Society of Japan, 2013 Autumn Symposium, Mar. 17, 2013, Abstract Book, 1P229.
The Ceramic Society of Japan, Annual Meeting, Mar. 18, 2013, Abstract Book, 2K09.
The 19$^{th}$ International Conference on Solid State Ionics, Jun. 4, 2013, Abstract Book, Tue-E-050.

* cited by examiner

Fig. 1C  EXAMPLE 1-3 $Nd_{1.04}Ba_{0.96}InO_{4.02}$
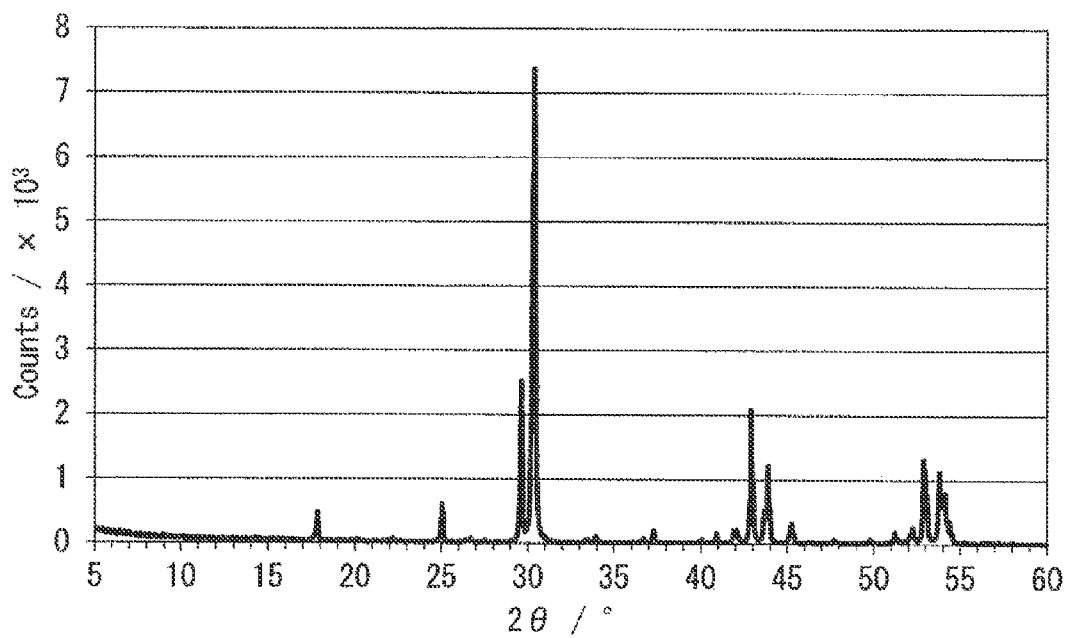
Fig. 1D  EXAMPLE 1-4 $Nd_{1.03}Ba_{0.97}InO_{4.015}$
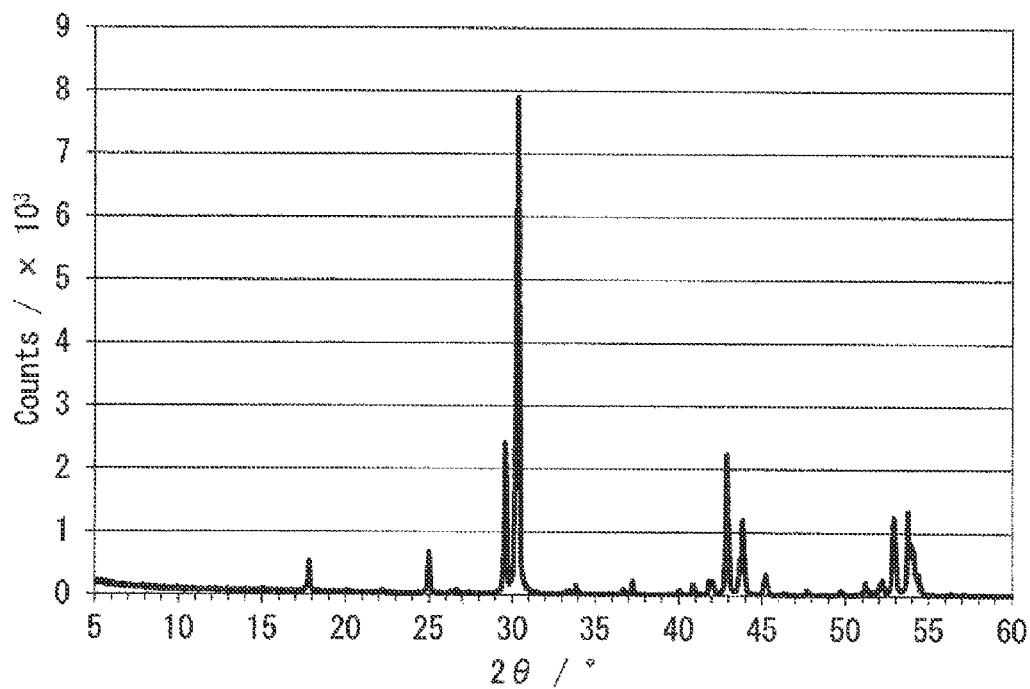

EXAMPLE 1-5 $Nd_{1.02}Ba_{0.98}InO_{4.01}$

EXAMPLE 1-6 $Nd_{1.01}Ba_{0.99}InO_{4.005}$

Fig. 1G    EXAMPLE 1-7 $Nd_{0.9}Ba_{1.1}InO_{3.95}$
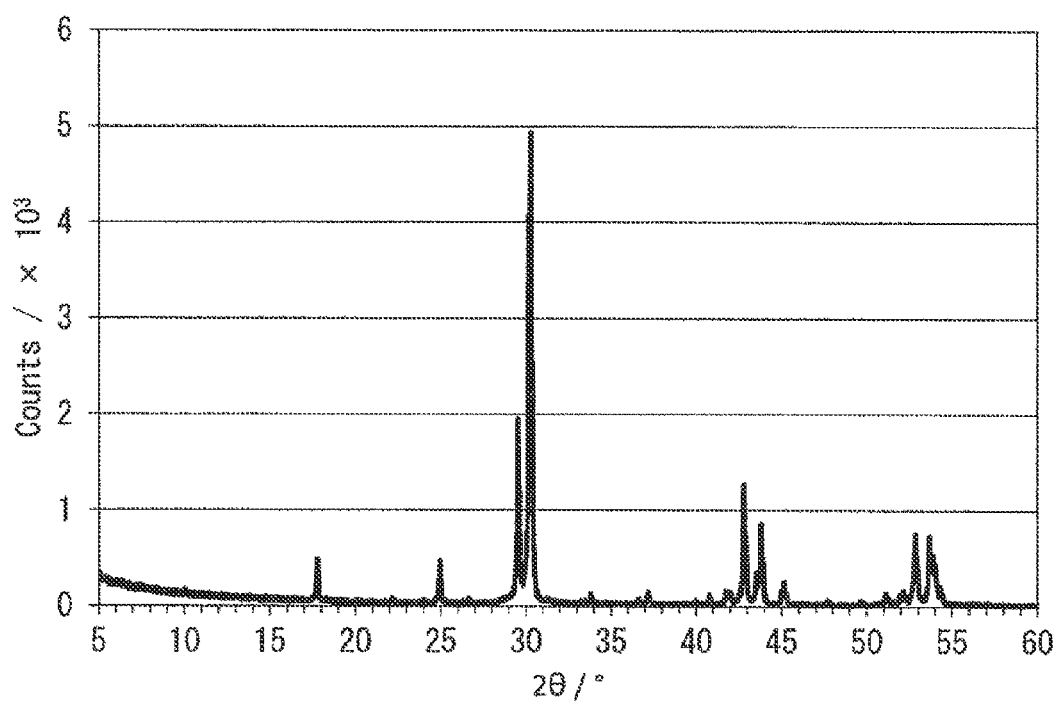
Fig. 1H    EXAMPLE 1-8 $Nd_{0.8}Ba_{1.2}InO_{3.9}$
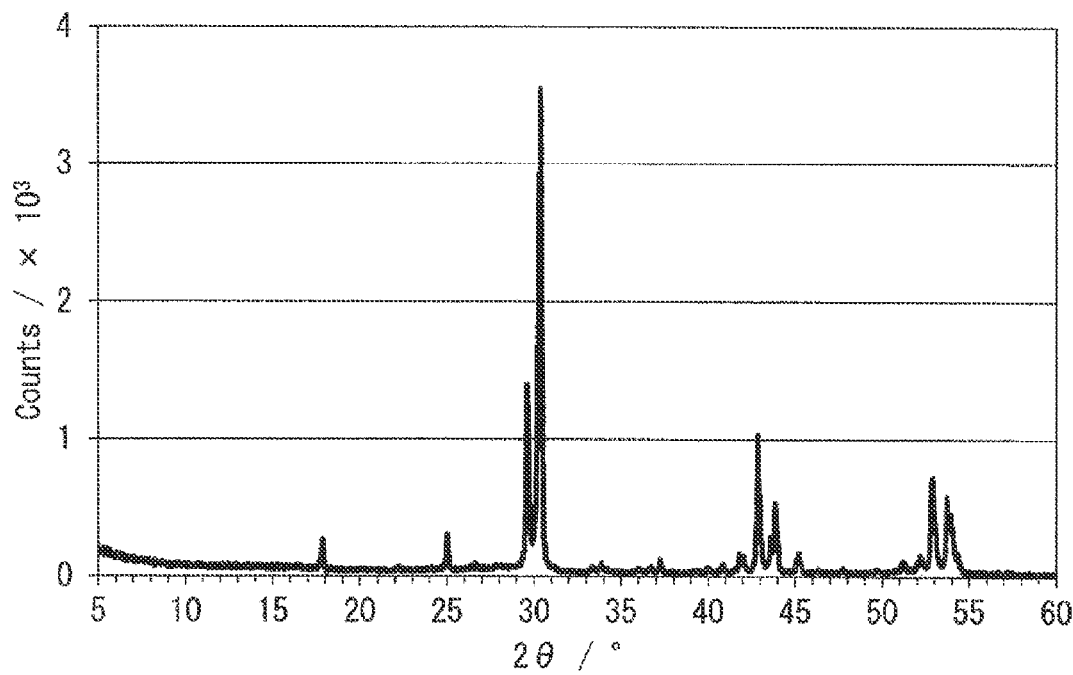

EXAMPLE 1-9 $Nd_{0.85}Ba_{1.15}InO_{3.925}$

EXAMPLE 1-1 $NdBaInO_4$

EXAMPLE 1-1 NdBaInO$_4$

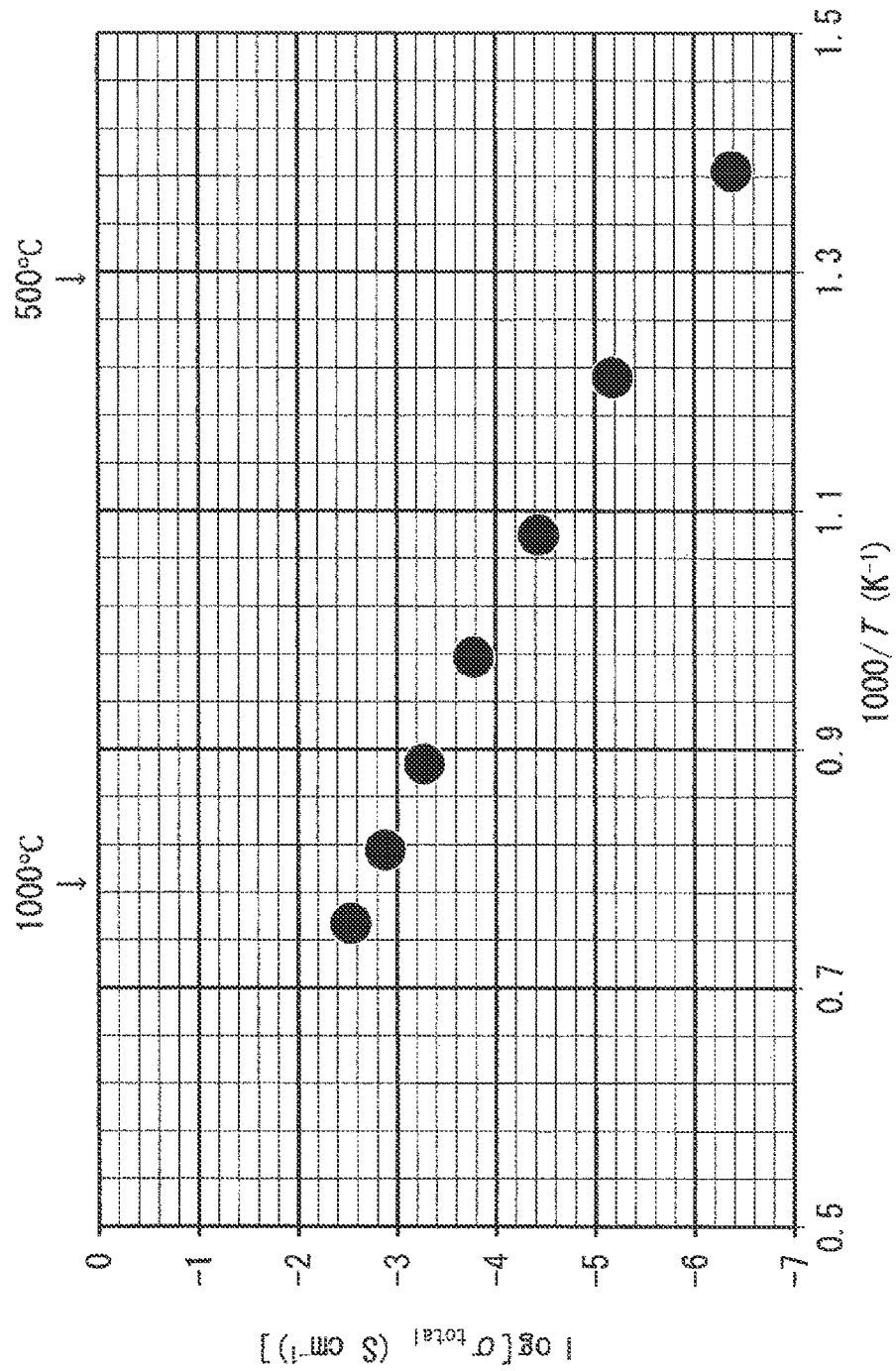

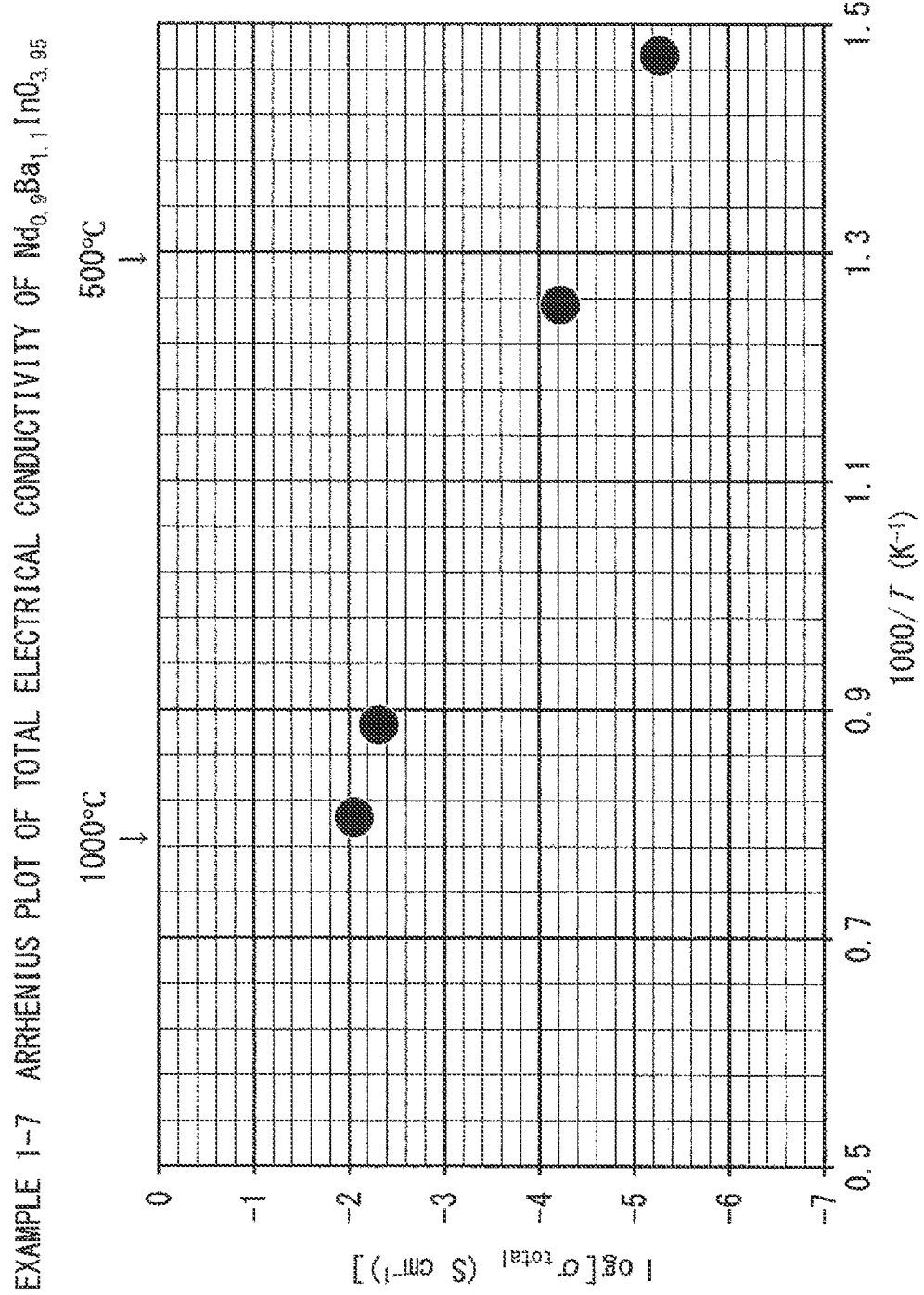

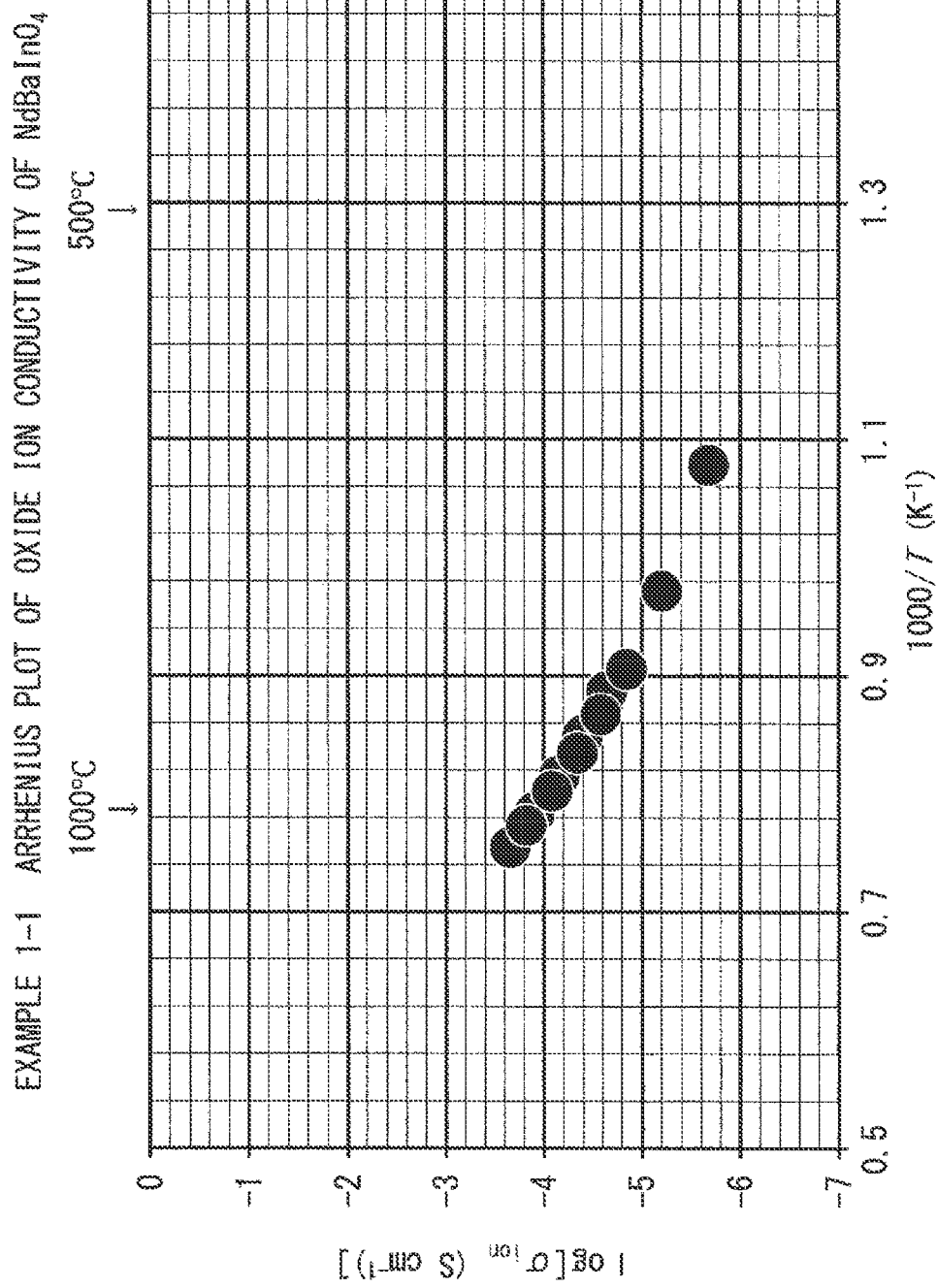

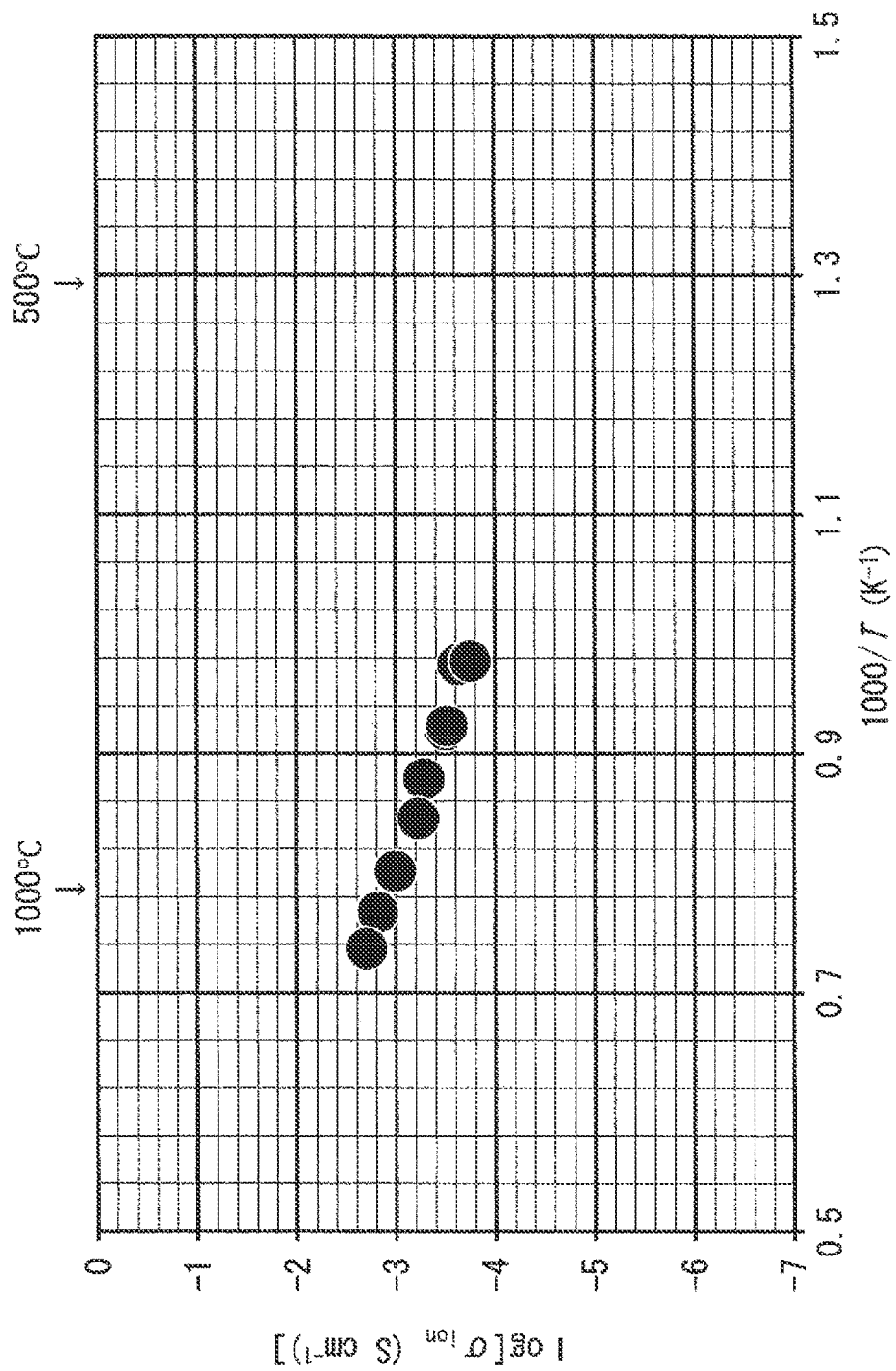

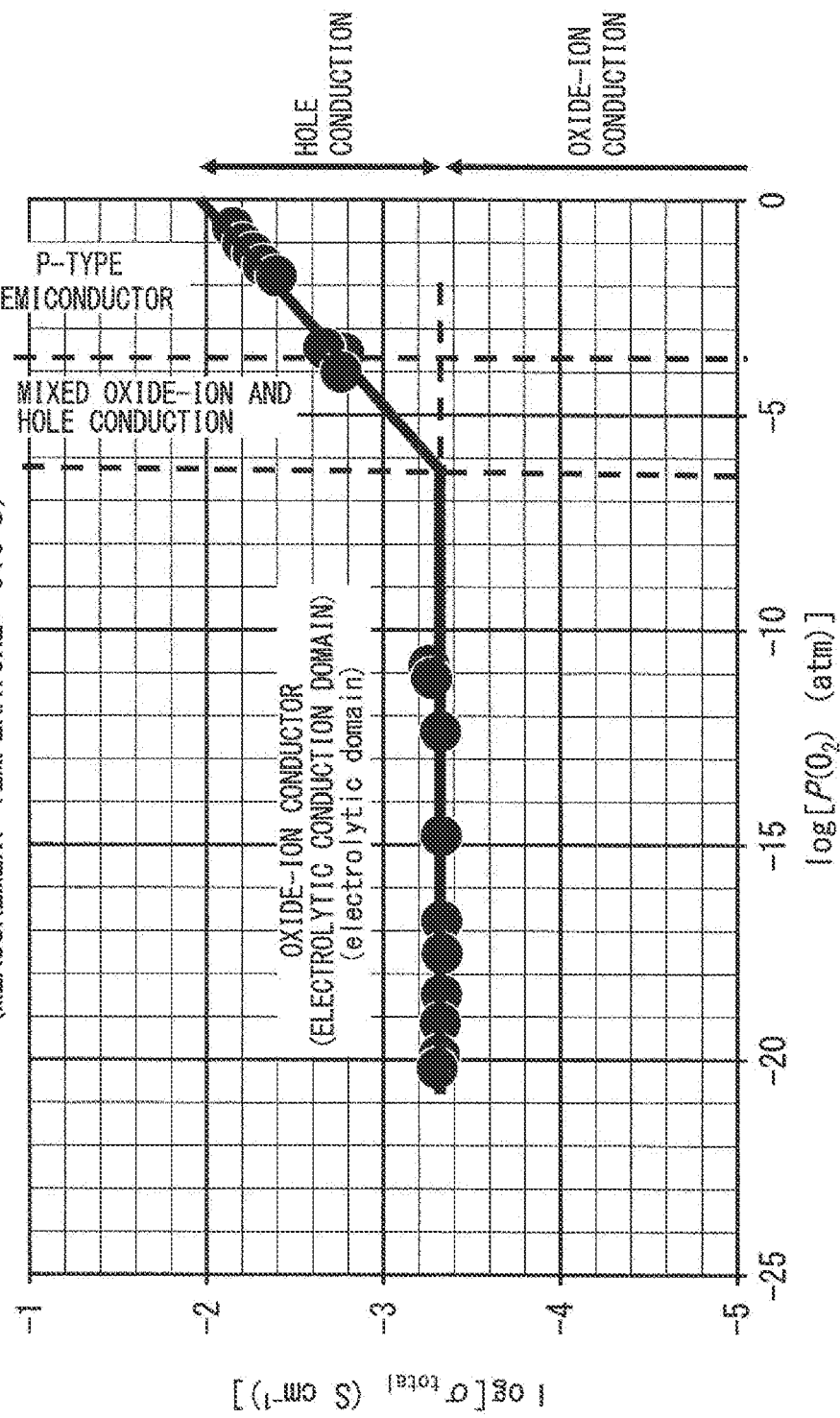

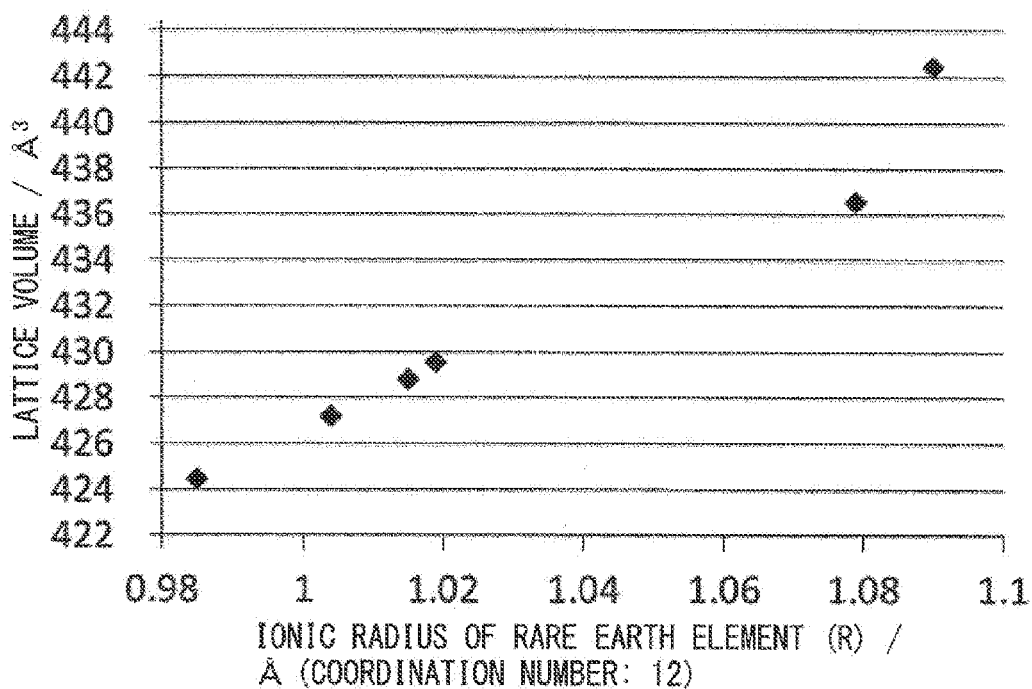
Fig. 10
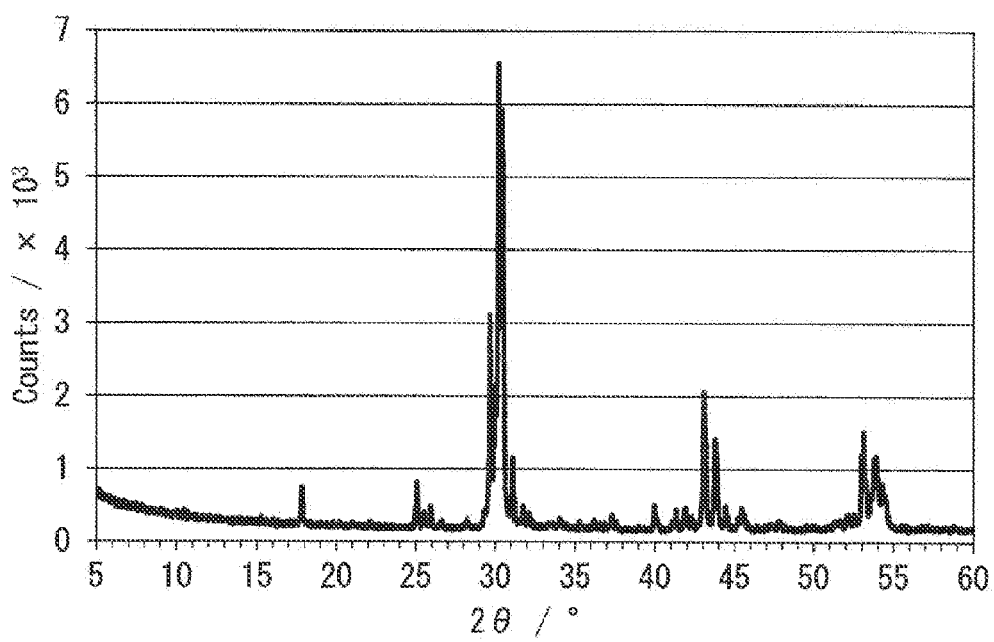
Fig. 11A  EXAMPLE 2-1 SmBaInO₄

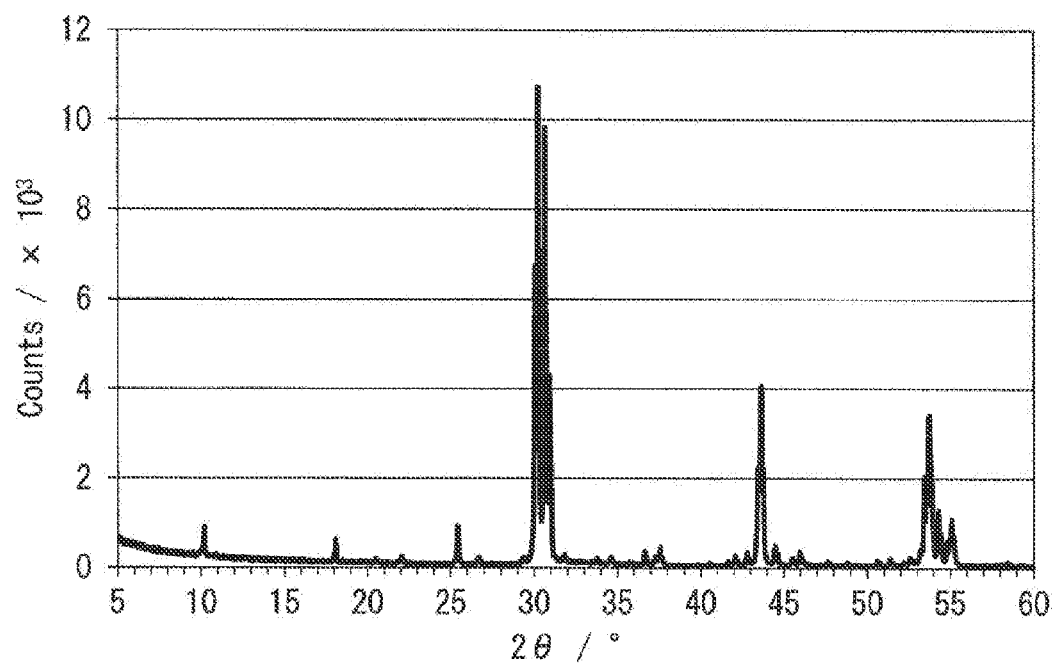
Fig. 11B EXAMPLE 2-2 YBaInO$_4$
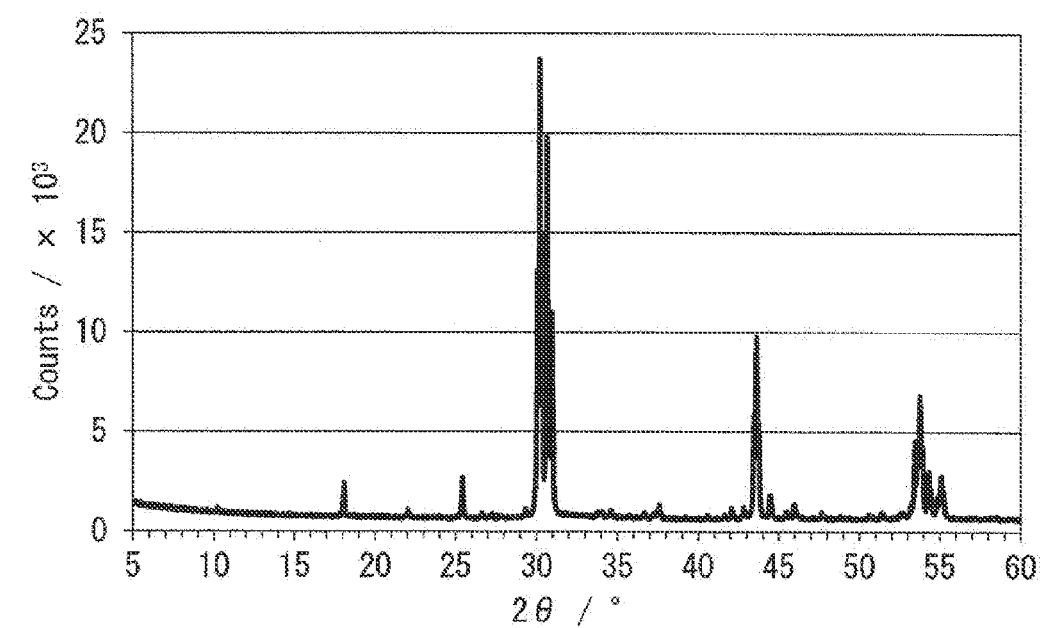
Fig. 11C EXAMPLE 2-3 HoBaInO$_4$

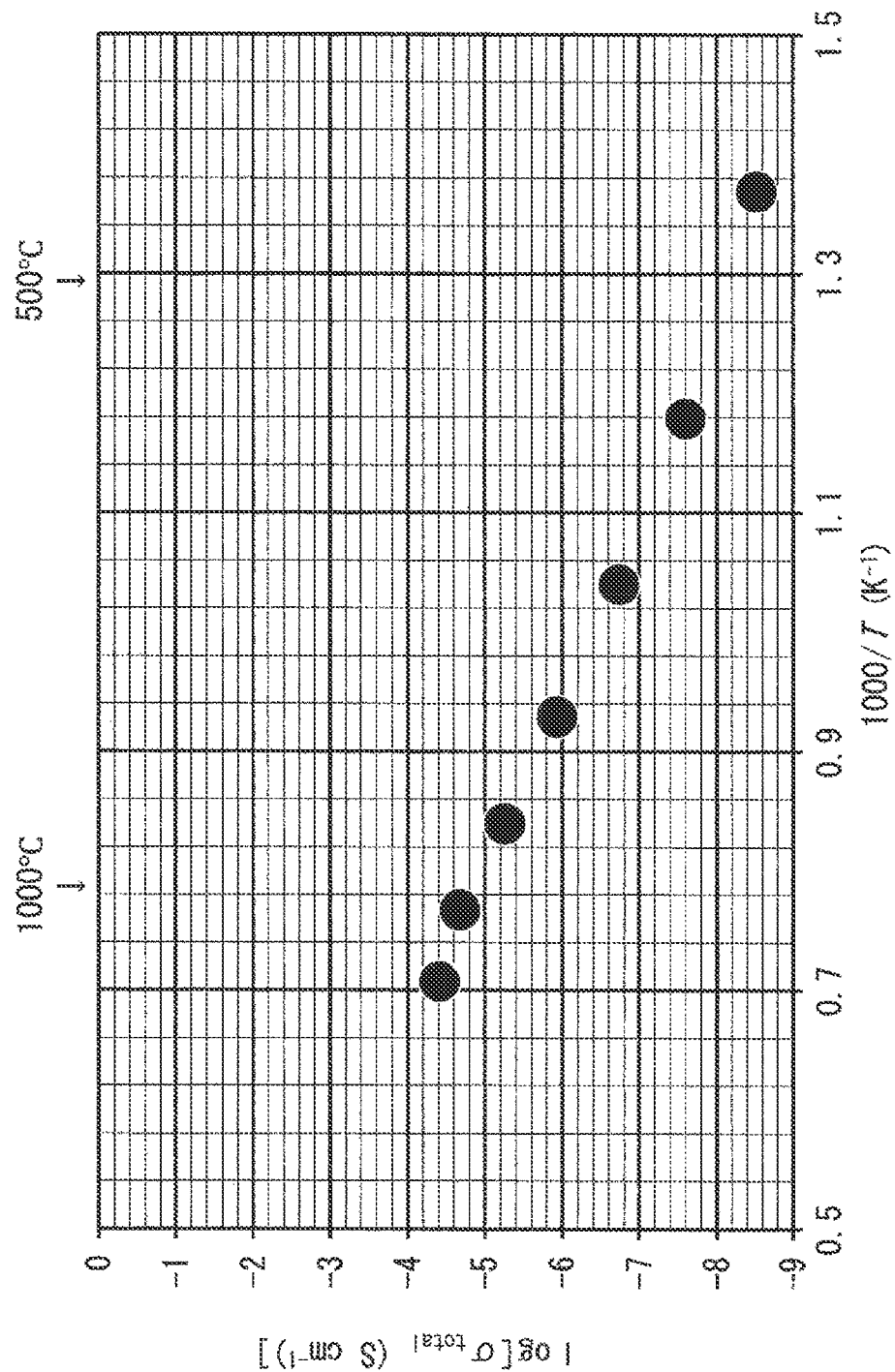

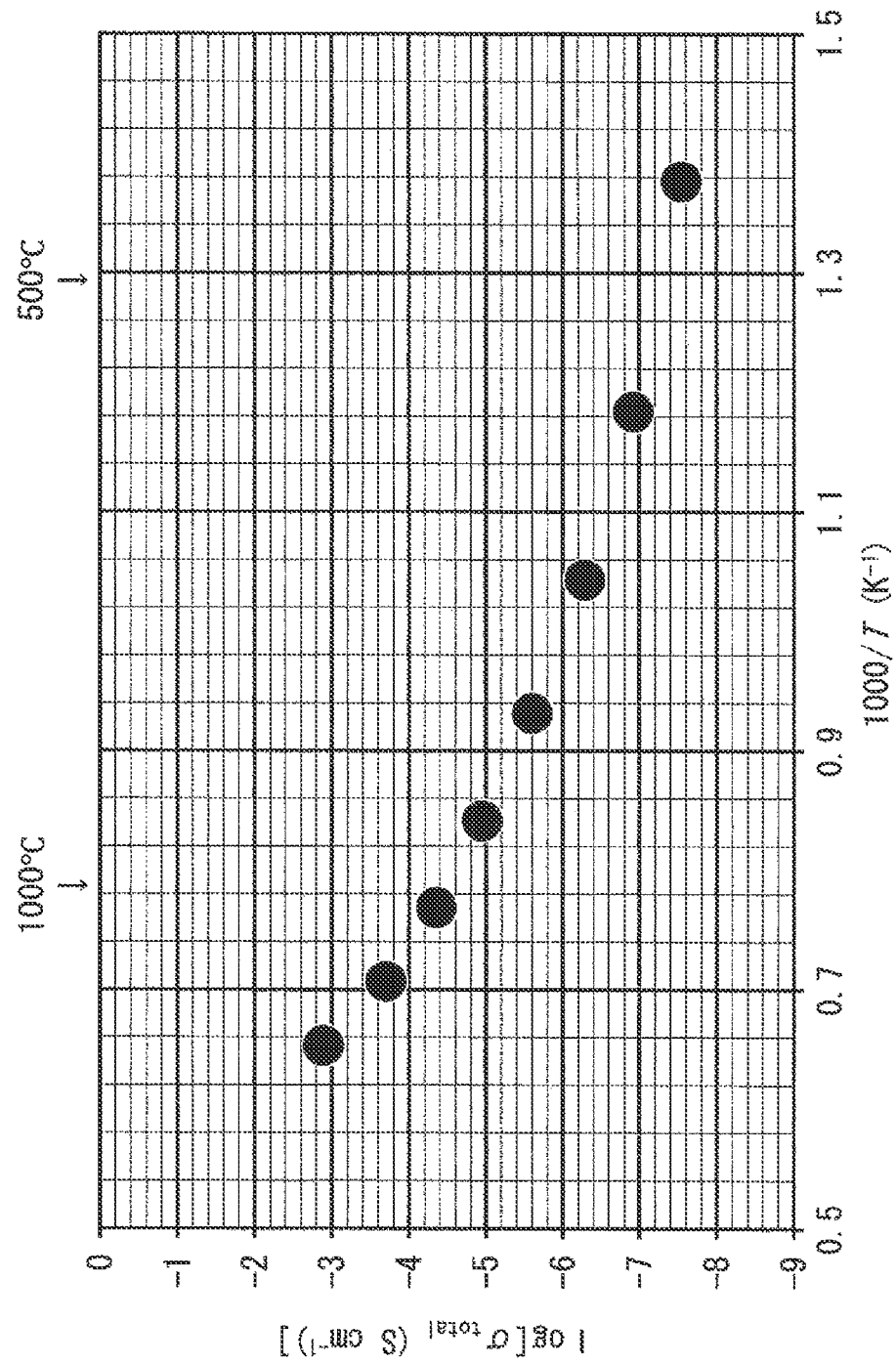

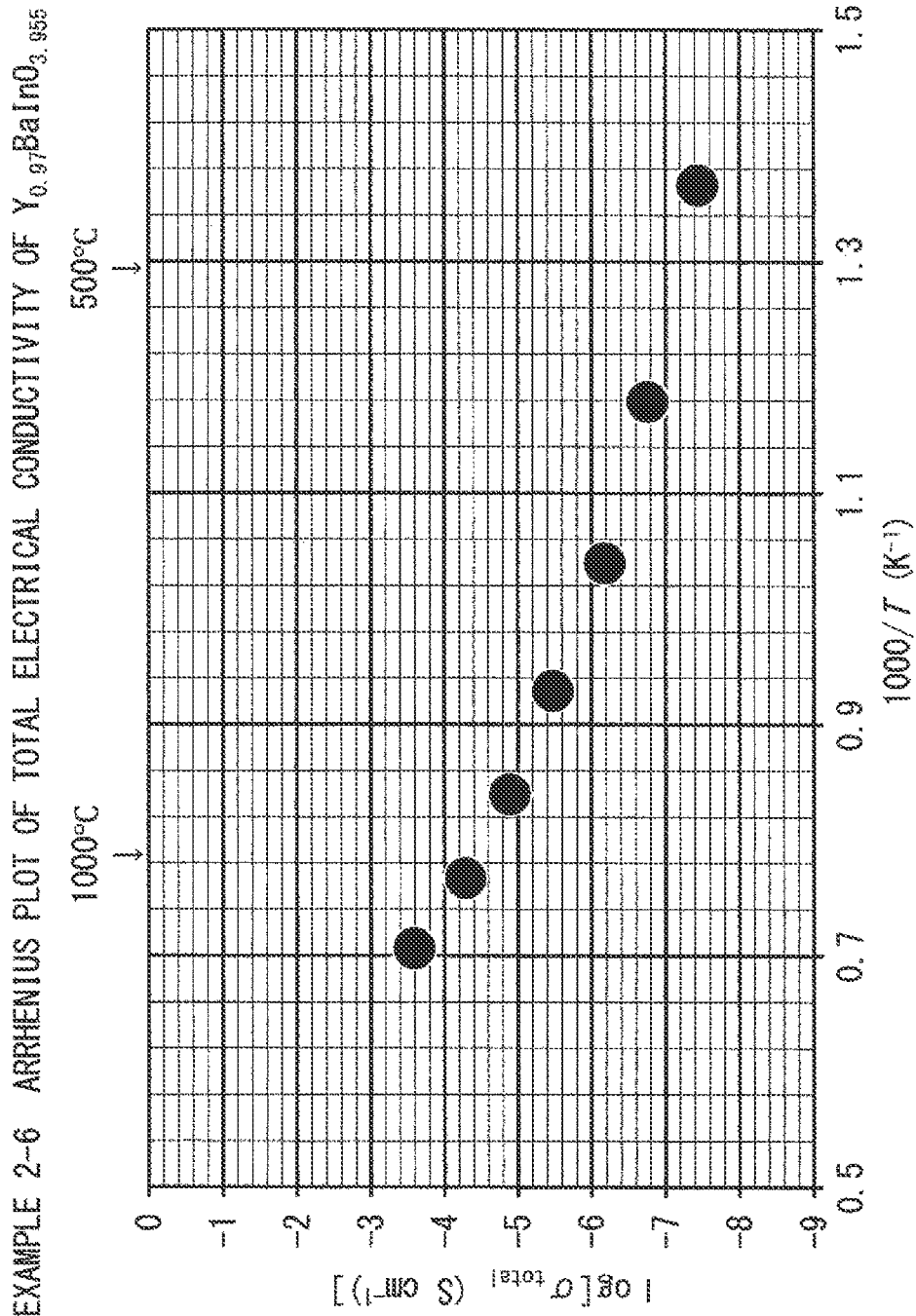

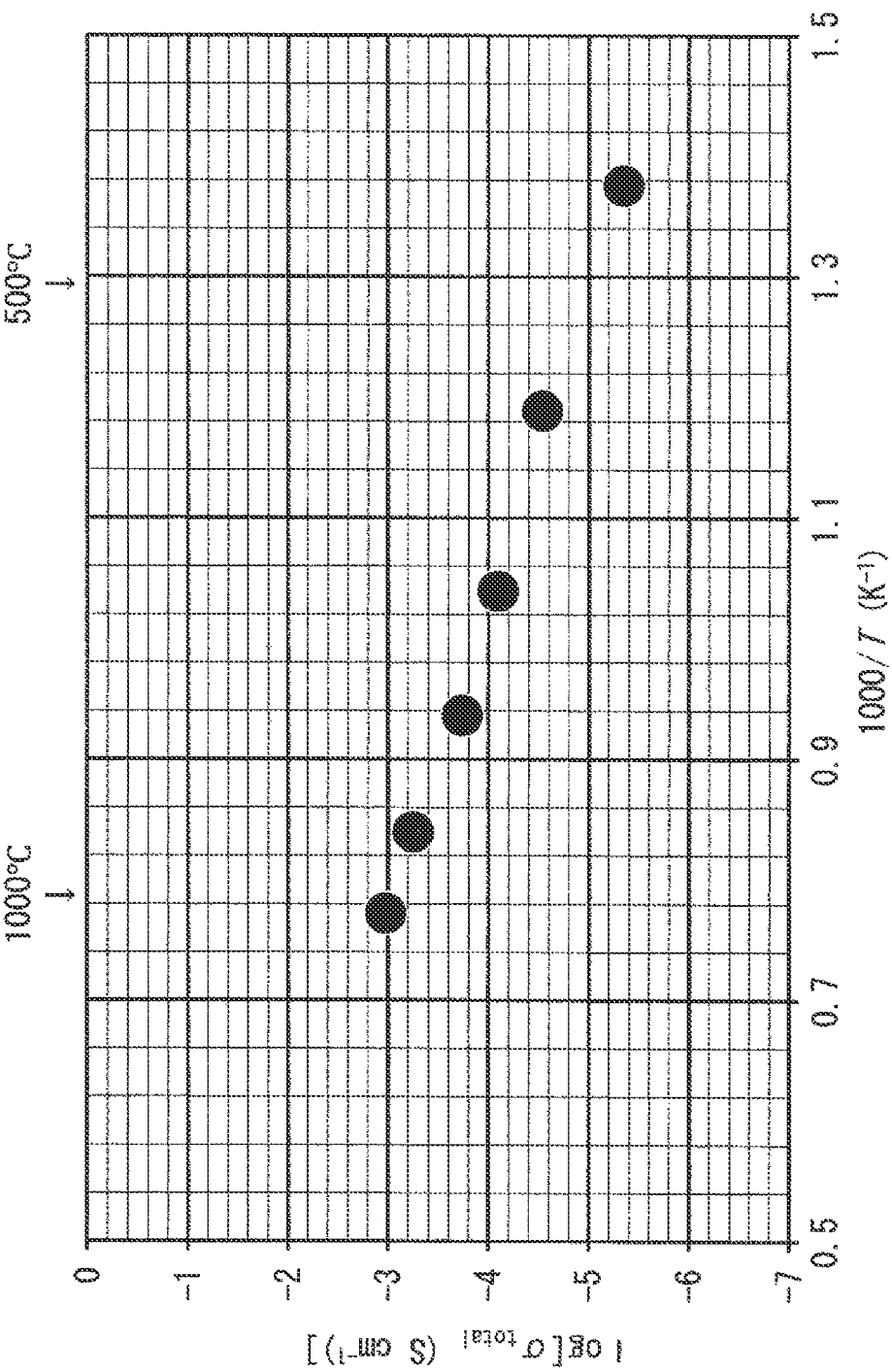

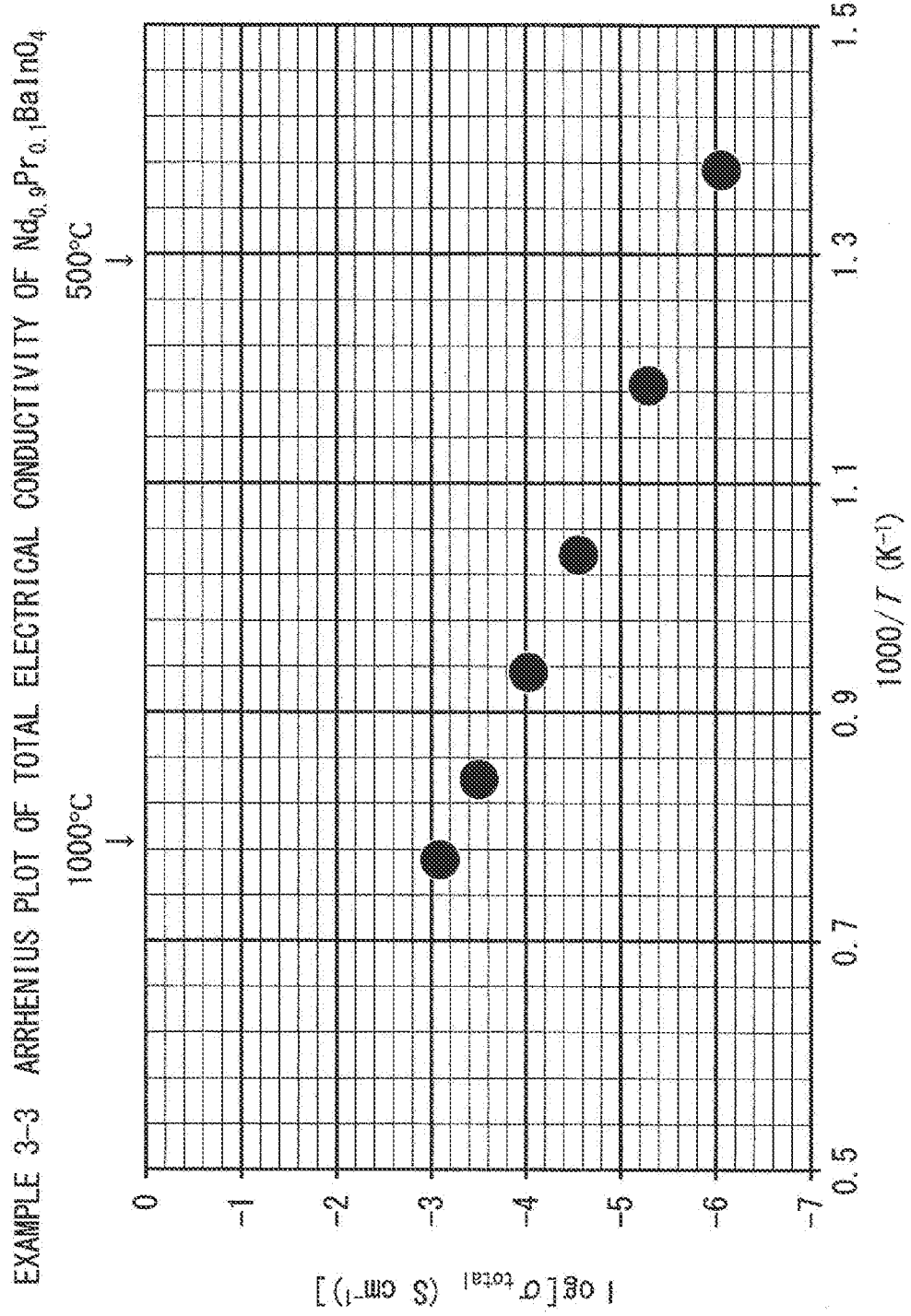

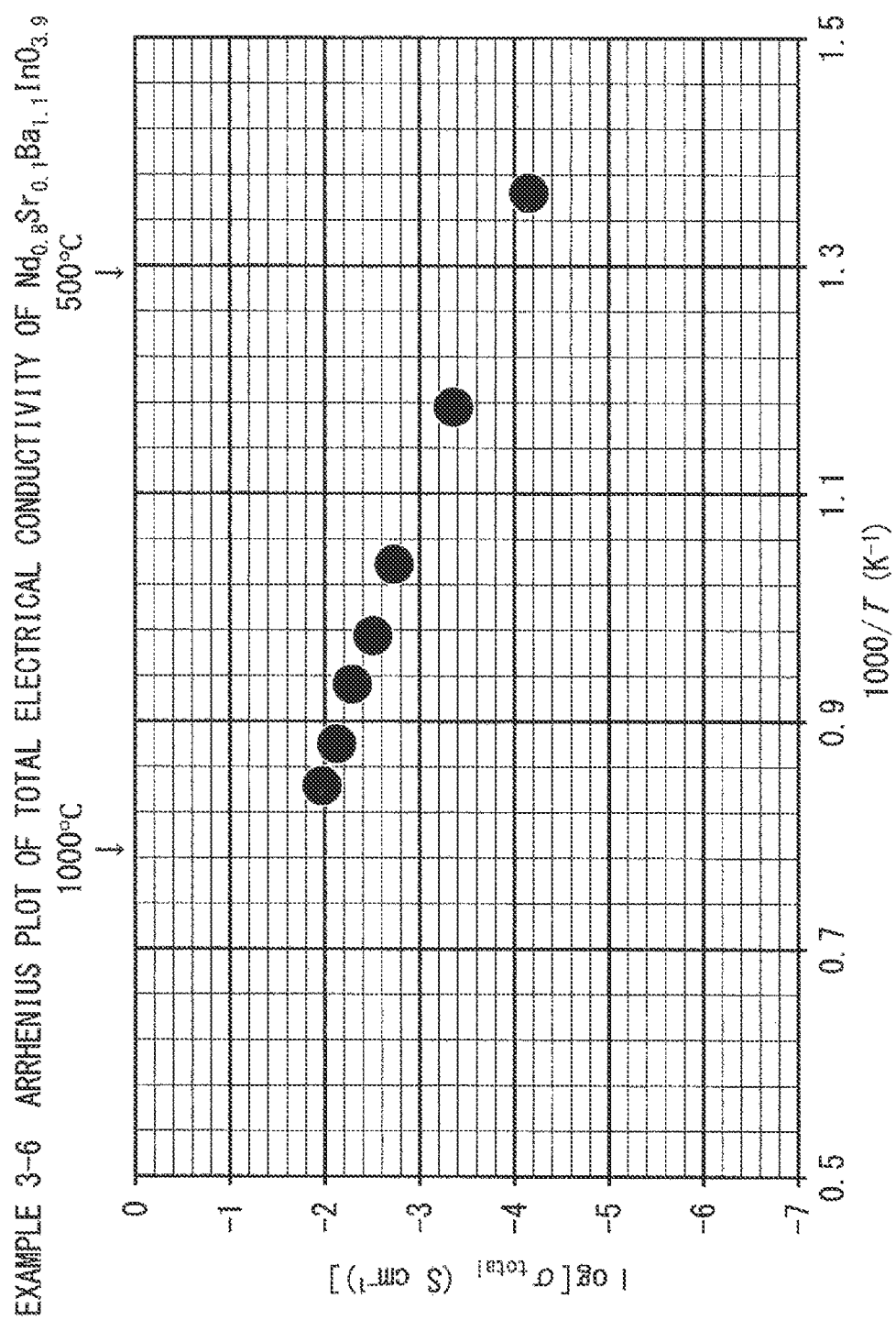

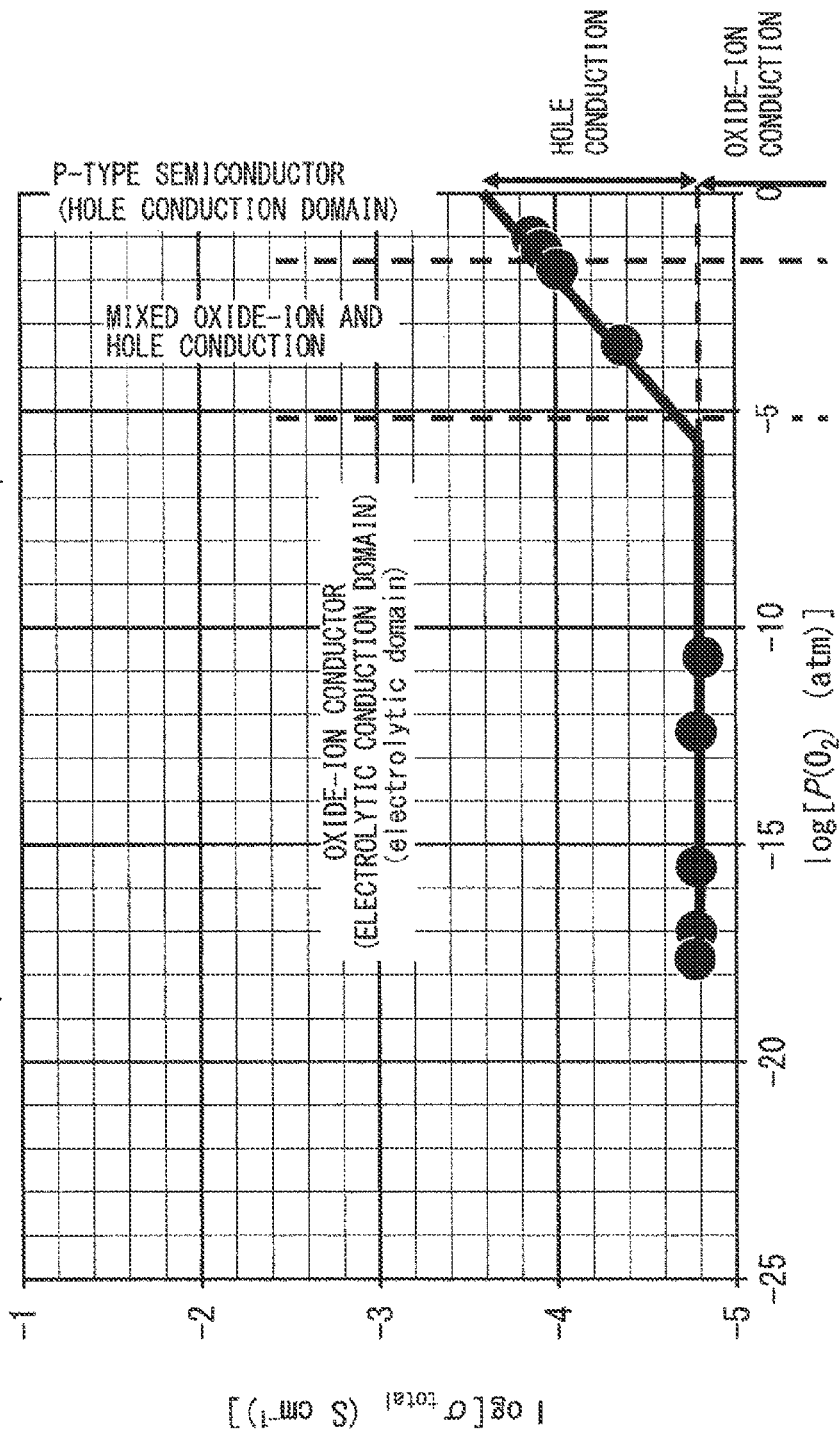

PEROVSKITE RELATED COMPOUND

INCORPORATION BY REFERENCE

This application is based upon and claims the benefit of priority from Japanese patent application No. 2013-175611, filed on Aug. 27, 2013, and No. 2014-008192, filed on Jan. 21, 2014, the disclosure of which is incorporated herein in its entirety by reference.

BACKGROUND OF THE INVENTION

1. Field of the Invention

The present invention relates to compounds whose structures contain the perovskite units (hereinafter referred to as "perovskite related compounds").

2. Description of Related Art

Perovskite-type complex oxides and perovskite related compounds exhibit various physical properties. Therefore, they have been used and studied in a wide range of fields.

For example, these materials exhibit physical properties such as anion conduction as oxide-ion conduction, cation conduction as lithium-ion conduction, proton conduction, electronic conduction, ferroelectricity, ferromagnetism, and high-temperature superconduction.

In the perovskite related compounds, materials with layered structures are known. Examples of such materials with the layered structures include:

RP (Ruddlesden-Popper) compounds expressed by a general formula "$A_{n+1}B_nX_{3n+1}$", DJ (Dion-Jacobson) compounds expressed by a general formula "$A_nB_nX_{3n+1}$", and Au (Aurivillius) compounds expressed by a general formula "$A_{n+1}B_nX_{3n+3}$". Here A and B represent cations at A and B sites respectively and X stands for anions such as oxide ions at X sites, and n is a natural number.

These solid materials can exhibit unique physical properties due to the layered structures.

For example, in the case of the RP compound, the interstitial oxygen atoms in rock-salt units and/or the oxygen vacancies in the perovskite units are considered to increase the oxide-ion conductivity.

The RP compounds with n=1 are the $K_2NiF_4$-type compounds.

CITATION LIST

Non Patent Literature

Non-patent literature 1: The Crystallographic Society of Japan, Oct. 25, 2012, Abstract Book 26-PB-01

Non-patent literature 2: The Ceramic Society of Japan, 2013 Autumn Symposium, Mar. 17, 2013, Abstract Book, 1P229

Non-patent literature 3: The Ceramic Society of Japan, Annual Meeting 2013, Mar. 18, 2013, Abstract Book, 2K09

Non-patent literature 4: The 19th International Conference on Solid State Ionics, Jun. 4, 2013, Abstract Book, Tue-E-050φ

Materials with new layered structures can lead to the developments of new technologies.

SUMMARY OF THE INVENTION

The present invention has been made in view of the above-described situation and an object thereof is to provide perovskite related compound with new layered structures.

A first exemplary aspect of the present invention is a perovskite related compound with a layered structure in which a perovskite- and an A-rare earth structure units are alternately arranged, in which the reduced cell parameters $a_r$-$c_r$ and $\alpha_r$-$\gamma_r$ and the reduced cell volume $V_r$ are within the following ranges:

(Reduced Cell Parameters)

$a_r$=6.05±0.6 Å,
$b_r$=8.26±0.8 Å,
$c_r$=9.10±0.9 Å,
$\alpha_r$=103.4±10°,
$\beta_r$=90±10°,
$\gamma_r$=90±10°, and
$V_r$=442.37±67 Å³, where $a_r$, $b_r$, and $c_r$ are the a-, b-, and c-axis lengths, respectively, of the reduced cell, $\alpha_r$ is the angle between the b- and c-axes of the reduced cell, $\beta_r$ is the angle between the a- and c-axes of the reduced cell, and $\gamma_r$ is the angle between the a- and b-axes of the reduced cell.

In this patent application, at least one of the reduced cell parameters $a_r$, $b_r$, and $c_r$ can be m/n times as large as the aforementioned value, where m and n are independent natural numbers, the square roots of 2 or 3, or integral multiples thereof. Note that the values of $a_r$, $b_r$, and $c_r$ can be replaced with one another, or the values of $\alpha_r$, $\beta_r$, and $\gamma_r$ can be replaced with one another.

Further, the reduced cell parameters are the data at about 25° C. under the atmospheric pressure.

In this patent application, the term "ionic radius" refers to the ionic radius proposed by Shannon in 1976, unless otherwise specified.

In this patent application, the element groups follow the IUPAC nomenclature.

The present invention is able to provide perovskite related compound with new layered structures.

The above and other objects, features and advantages of the present invention will become more fully understood by the detailed description given hereinbelow and the accompanying drawings given by way of illustrations only, and thus are not to be considered as limiting the present invention.

BRIEF DESCRIPTION OF THE DRAWINGS

FIG. 1C shows the XRPD pattern of a sample obtained in Example 1-3, FIG. 1D shows the XRPD pattern of a sample obtained in Example 1-4, FIG. 1G shows the XRPD pattern of a sample obtained in Example 1-7, FIG. 1H shows the XRPD pattern of a sample obtained in Example 1-8, FIG. 6A shows the Arrhenius plot of the total electrical conductivity $\sigma_{total}$ of a sample obtained in Example 1-1, FIG. 6B shows the Arrhenius plot of the total electrical conductivity $\sigma_{total}$ of a sample obtained in Example 1-7, FIG. 7A shows the Arrhenius plot of oxide-ion conductivity $\sigma_{ion}$ of a sample obtained in Example 1-1, FIG. 7B shows the Arrhenius plot of oxide-ion conductivity $\sigma_{ion}$ of a sample obtained in Example 1-7, FIG. 8B shows the measurement result of the oxygen partial pressure P(O₂) dependence of the total electrical conductivity $\sigma_{total}$ of a sample obtained in Example 1-7 at 910° C., FIG. 10 shows the relation between the ionic radius of a rare earth ion (coordination number: 12) and the unit-cell volume V of RBaInO₄ (where R is rare earths), FIG. 11A shows the XRPD pattern of a sample obtained in Example 2-1, FIG. 11B shows the XRPD pattern of a sample obtained in Example 2-2, FIG. 11C shows the XRPD pattern of a sample obtained in Example 2-3, FIG. 12A shows the Arrhenius plot of the total electrical conductivity $\sigma_{total}$ of a sample obtained in Example 2-1, FIG. 12B shows the Arrhenius plot of the total electrical conductivity $\sigma_{total}$ of a sample obtained in Example 2-4, FIG. 12C shows the Arrhenius plot of the total electrical conductivity $\sigma_{total}$ of a sample obtained in Example 2-6, FIG. 15A shows the Arrhenius plot of the total electrical conductivity $\sigma_{total}$ of a sample obtained in Example 3-1, FIG. 15C shows the Arrhenius plot of the total electrical conductivity $\sigma_{total}$ of a sample obtained in Example 3-3, FIG. 15E shows the Arrhenius plot of the total electrical conductivity $\sigma_{total}$ of a sample obtained in Example 3-6, FIG. 16B shows the measurement result of the oxygen partial pressure P(O₂) dependence of the total electrical conductivity $\sigma_{total}$ of a sample obtained in Example 3-3 at 851° C.

DESCRIPTION OF THE EXEMPLARY EMBODIMENTS

Figure 1A:
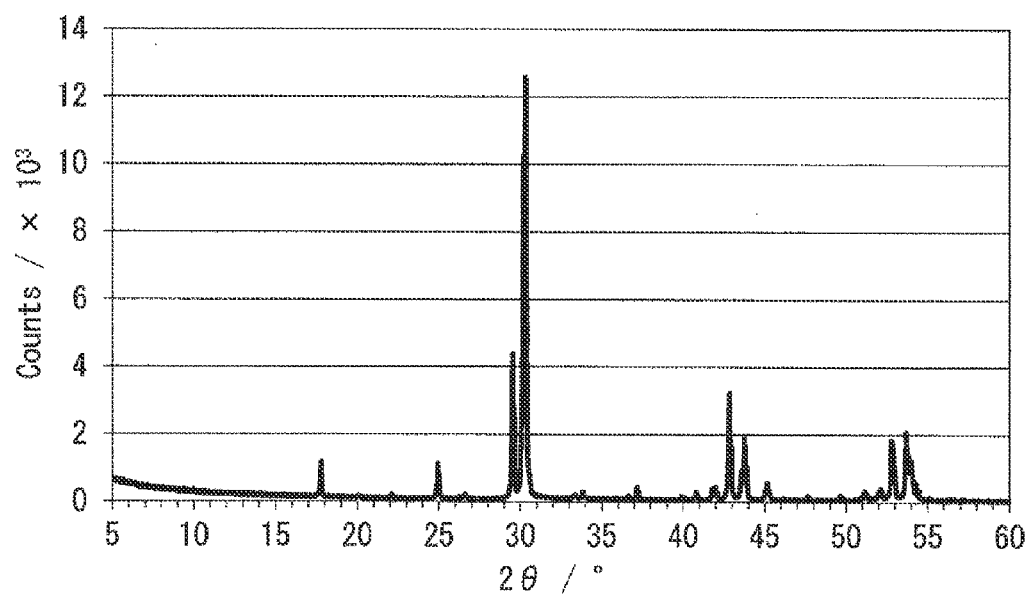
FIG. 1A shows the X-ray powder diffraction (XRPD) pattern of a sample obtained in Example 1-1.
Figure 1B:
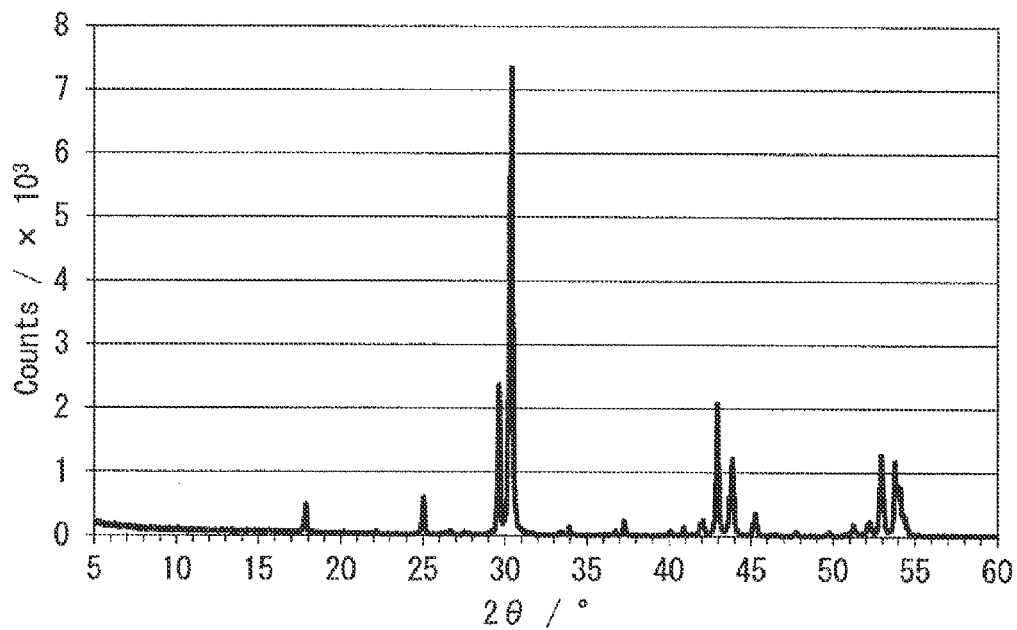
FIG. 1B shows the XRPD pattern of a sample obtained in Example 1-2.
Figure 1E:
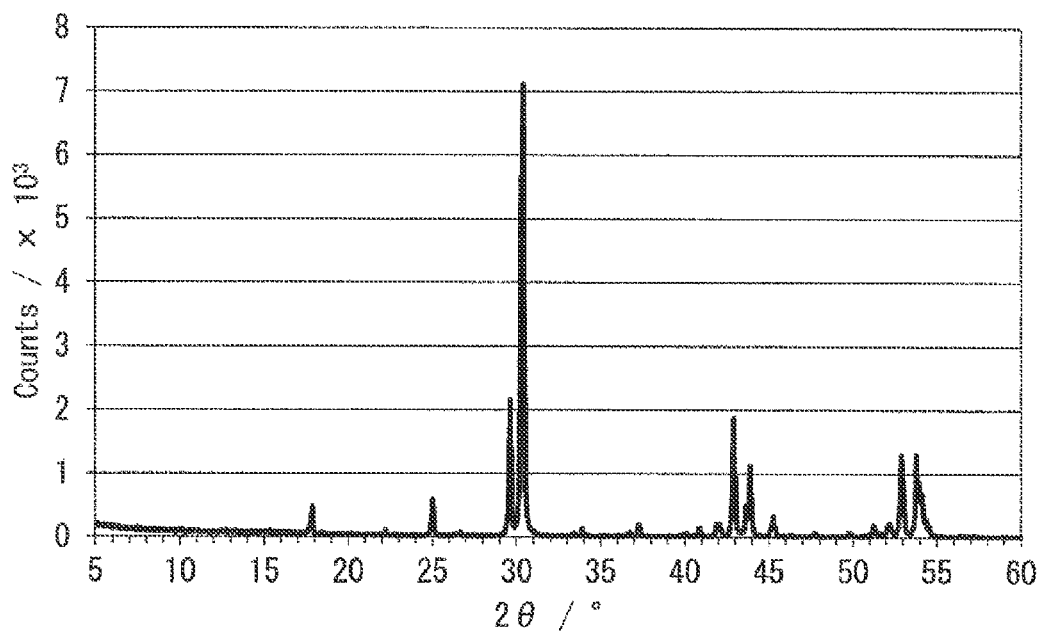
FIG. 1E shows the XRPD pattern of a sample obtained in Example 1-5.
Figure 1F:
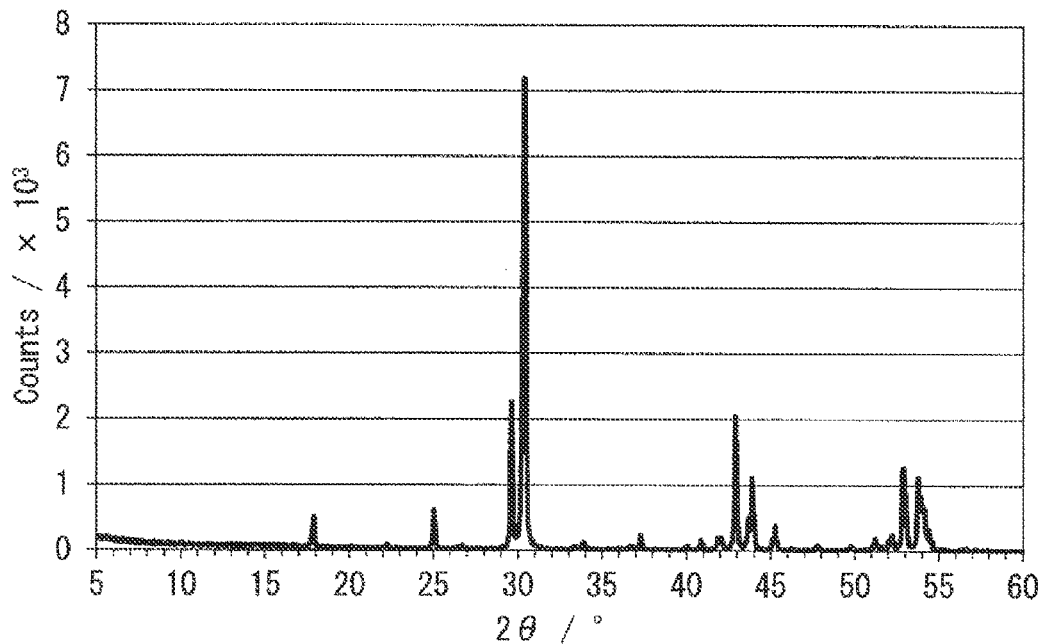
FIG. 1F shows the XRPD pattern of a sample obtained in Example 1-6.
Figure 1I:
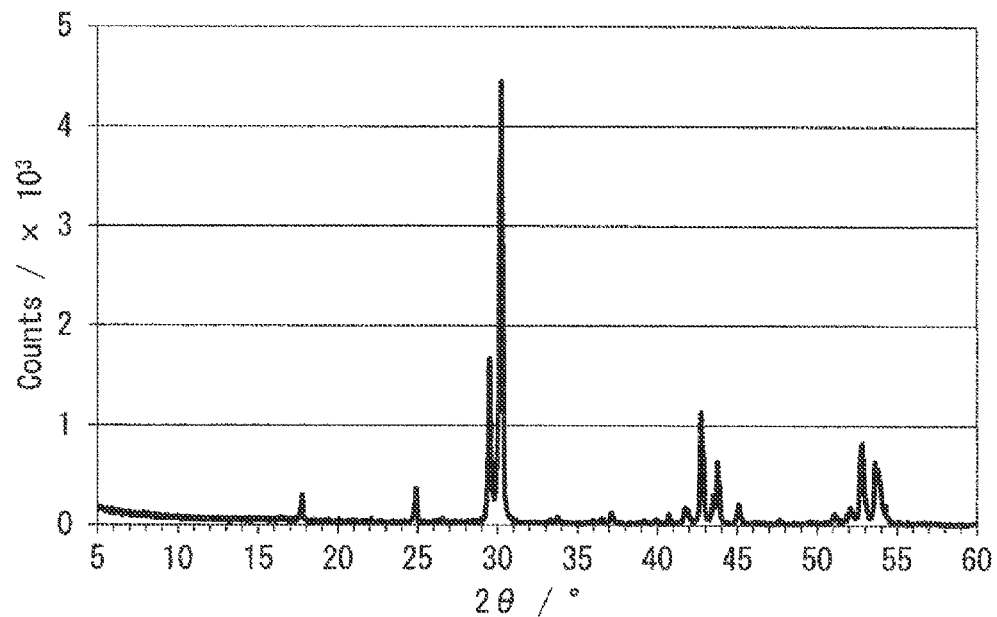
FIG. 1I shows the XRPD pattern of a sample obtained in Example 1-9.

In order to invent compounds with new layered structures, the inventors of the present application have studied perovskite related compounds AA'BX₄ where the A, A' and B are the cations at the A, A' and B sites respectively. Here the X stands for the anions such as oxide ions at the X sites.

The perovskite related compounds expressed by the general formula "AA'BX₄" include K₂NiF₄-type compounds, (A,A')BX₄ and A₂BX₄. Note that in the K₂NiF₄-type compounds (A,A')BX₄, the ionic radius of A is roughly equal to that of A'.

To invent new materials, the inventors of the present application designed materials by choosing the A and A' cations where the ratio of the ionic radius of A' to the ionic radius of A is larger than those of the K₂NiF₄-type compounds and by choosing, for B, ions with which perovskite units are expected to be formed inside the crystal structures.

We also studied combinations of "rare earth element/Ba/In" as combinations of A/A'/B. As a result, we found perovskite related compounds with new layered structures.

It should be noted that the compositions are not limited to the aforementioned ones. The layered structures are new features, and the compositions are selected so that the resultant compounds have the new layered structures.

Note that in the general formula AA'BX₄ the number of the anions is the value that satisfies the charge neutrality condition and could change from the standard value 4 to some extent.

The perovskite related compounds of the present invention are regarded to have layered structures in which perovskite units and A-rare earth structure units are alternately arranged.

For the perovskite related compounds of the present invention, the reduced cell parameters $a_r$ to $c_r$ and $\alpha_r$ to $\gamma_r$ and the reduced cell volume $V_r$ are within the following ranges:

(Reduced Cell Parameters)

$a_r$=6.05±0.6 Å,
$b_r$=8.26±0.8 Å,
$c_r$=9.10±0.9 Å,
$\alpha_r$=103.4±10°,
$\beta_r$=90±10°,
$\gamma_r$=90±10°, and
$V_r$=442.37±67 Å³, where $a_r$, $b_r$, and $c_r$ are the a-, b-, and c-axis lengths, respectively, of the reduced cell, $\alpha_r$ is the angle between the b- and c-axes of the reduced cell, $\beta_r$ is the angle between the a- and c-axes of the reduced cell, and $\gamma_r$ is the angle between the a- and b-axes of the reduced cell.

The perovskite related compounds of the present invention have layered structures in which perovskite units and A-rare earth structure units are alternately arranged. In these structures, anions such as oxide ions and fluoride ions are considered to diffuse around cations at the A and B sites, and the perovskite related compounds of the present invention exhibit conductivity. Furthermore, cations such as lithium ions and copper ions and/or protons are considered to diffuse around anions at the X sites while repelling other cations, and the perovskite related compounds of the present invention exhibit cation conductivity such as lithium-ion conduction and/or proton conduction. Optimizing these structures, it is expected to improve the ion conduction such as the oxide-ion conduction or the lithium-ion conduction and/or the proton conduction.

In perovskite related compounds of the present invention, because the edges of the $BK_6$-octahedra of the perovskite units are in contact with the A-rare earth structure units (where B is cations at the B sites and is at least one of cations, and X is at least one of anions), arbitrary ions (anions such as oxide ions and fluoride ions and/or cations such as lithium ions and copper ions) and/or protons tend to diffuse (i.e., conduction tends to occur).

As related studies, the inventors of the present application have reported $NdBaInO_4$ in the academic society meeting prior to the present application (see Non-Patent literature 1 to 4, which are Abstract Book of the academic society meeting).

In Non-Patent literature 1, the applicants have reported that $NdBaInO_4$ has the layered structure of In—O—Ba slabs and Nd—O units, and exhibits ionic conduction. However, neither any report on any layered structure of perovskite units and A-rare earth structure units nor any proper space group has been published yet. Furthermore, the reduced cell parameters $a_r$-$c_r$ and $\alpha_r$-$\gamma_r$ and the reduced cell volume $V_r$ in the crystal structure are also not within the ranges defined according to the present invention. Further, the composition in which Nd is replaced with a different rare earth element R, such as $RBaInO_4$ and $R_{1-x}BaInO_{4-3x/2}$, has been unpublished.

The provision for "exceptions to lack of novelty of invention" is applied to other publications reported in the academic society meetings.

The perovskite related compounds of the present invention have, for example, the compositions expressed by the following general formula (I):

$$A_xA'_yBX_z \qquad (I).$$

(where, A are cations at A sites and are at least one of cations with the coordination number from 6 to 9 with X, A' are cations at A' sites and are at least one of cations with the coordination number from 9 to 12 with X, the average ionic radius and/or the average valence of A are/is different from those of A'

B are cations at B sites and are at least one of cations with the coordination number of 6 with X, and these coordination numbers of A and B are coordination numbers where there are no anion vacancies and/or no interstitial anions, X consists of at least one anion, x+y is a value in the range of 2±1, and z is a value in the range of 4±0.8.)

The symbol z in the above general formula (I) is a value that satisfies the charge neutrality condition. As described above, its standard value is 4 but could change from the standard value 4 to some extent.

The perovskite units consist of for example, A, A', B and X. The perovskite unit consists of a $BX_6$ octahedron and eight cations (A and A') where the $BX_6$ octahedron is surrounded by the eight cations. The octahedron contains a B-site cation and six X anions. The perovskite units are considered to have a composition "$A_{0.25}A'_{0.75}BX_3$" or similar compositions.

The A-rare earth structure units consist of, for example, A and X. The A-rare earth structure unit consists of an A-site cation and 6 to 9 anions where A-site cation is surrounded by 6 to 9 anions. Therefore, the A-rare earth structure units have structures similar to those of the A-rare earth structures.

Note that the numbers of anions described above are numbers where there are no anion vacancies and no interstitial anions. Further, the numbers of cations described above and the composition of the perovskite units are those where there are no cation vacancies.

It is better that the average ionic radius of A' is larger than that of A. By increasing the difference between the average ionic radii of A and A', A and A' occupy different sites, which enables the formation of crystal structures of the present invention.

A can include cations of at least one of elements selected from the group consisting of Li, Na, Mg, K, Ca, Sc, Mn, Fe, Co, Cu, Zn, Rb, Sr, Y, Mo, Tc, Cd, In, Te, Cs, Ba, La, Ce, Pr, Nd, Pm, Sm, Eu, Gd, Tb, Dy, Ho, Er, Tm, Yb, Lu, Hf, W, Hg, Tl, Pb, Bi, Po, Ra, Th, Pa, U, Np and Pu.

A' can include cations of at least one element, selected from the group consisting of Li, Na, Mg, K, Ca, Sc, Mn, Fe, Co, Cu, Zn, Rb, Sr, Y, Mo, Tc, Cd, In, Te, Cs, Ba, La, Ce, Pr, Nd, Pm, Sm, Eu, Gd, Tb, Dy, Ho, Er, Tm, Yb, Lu, Hf, W, Hg, Tl, Pb, Bi, Po, Ra, Th, Pa, U, Np and Pu, and have an average ionic radius larger than that of A.

B can include cations of at least one element, selected from the group consisting of Li, Be, Mg, Al, Si, P, Sc, Ti, V, Cr, Mn, Fe, Co, Ni, Cu, Zn, Ga, Ge, As, Se, Y, Zr, Nb, Mo, Tc, Ru, Rh, Pd, Ag, Cd, In, Sn, Sb, Te, Ce, Pr, Pm, Sm, Eu, OGd, Tb, Dy, Ho, Er, Tm, Yb, Lu, Hf, Ta, W, Re, Os, Ir, Pt, Au, Tl, Pb, Bi, Po, At, Th, Pa, U, Np and Pu.

X can include anions of at least one element, selected from the group consisting of N, O, F, S, Cl, Se, Br, Te and I.

For the perovskite related compounds of the present invention, the materials for the combination of A, A', B and X can be designed, for example, as shown below.

A, A', B and X are selected so that total electrical charge is zero. For example, in the case of $NdBaInO_4$ in the below-explained [Examples], A, A', B and X are $Nd^{3+}$, $Ba^{2+}$, $In^{3+}$ and $O^{2-}$, respectively, and the total electrical charge is zero.

X can be oxide ions alone, different anions alone, or the combination of oxide ions and other anions.

The guideline for the material design is to select A, A', B and X so that $A_{0.75}A'_{0.25}BX_3$ could form a perovskite unit. In general, when the tolerance factor "t" of $ABX_3$ is equal to or close to unity, $ABX_3$ perovskite structures can be formed. For $AA'BO_4$, the guideline for the material design is to select A, A', B and X so that the tolerance factor "t" for $A_{0.75}A'_{0.25}BX_3$ expressed in the below-shown formula is equal to or close to unity.

$$t=(0.25r(A)+0.75r(A')+r(X))/(2(r(B)+r(X)))^{1/2}$$

(where r(A) is the average ionic radius of A, r(A') is the average ionic radius of A', r(B) is the average ionic radius of B, and r(X) is the average ionic radius of X).

A is selected so that crystal structures with the layered structures of perovskite units and A-rare earth structure units could be obtained. For example, the aforementioned layered structures can be obtained when A is selected from cations with an average ionic radius smaller than that of A'.

The inventors of the present application prepared perovskite related compounds with the layered structures consisting of perovskite units and A-rare earth structure units and with the reduced cell parameters specified according to the present invention for the cases where:

A includes ions of at least one of rare-earth elements,

A' includes ions of at least one of group-2 elements, and

B includes ions of at least one of group-13 elements.

Examples of the ions of rare-earth elements used as A include cations of at least one of elements selected from the group consisting of Sc, Y and lanthanide elements (La, Ce, Pr, Nd, Pm, Sm, Eu, Gd, Tb, Dy, Ho, Er, Tm, Yb and Lu).

Examples of the ions of group-2 elements used as A' include cations of at least one of elements which are selected from the group consisting of Mg, Ca, Sr, Ba and Ra, and whose average ionic radius is larger than that of A.

Examples of the ions of group-13 elements used as B include cations of at least one of elements selected from the group consisting of Al, Ga, In and Tl.

The inventors of the present application have prepared perovskite related compounds with the layered structure consisting of perovskite units and A-rare earth structure units and with the reduced cell parameters specified according to the present invention for the cases where:

A includes ions of at least one of elements selected form the group consisting of Y, La, Pr, Nd, Sm, Ho, Er and Yb, A' includes at least Ba ions and/or Sr ions, and B includes at least In ions.

Further, we confirmed that the obtained perovskite related compounds showed various conduction behaviors including oxide-ion conduction, mixed oxide-ion and electronic conduction, mixed oxide-ion and hole conduction, electronic conduction, or hole conduction.

For the actual compound examples, refer to the below-explained [Examples] section.

The perovskite related compounds of the present invention can show various conduction behaviors including oxide-ion conduction, mixed oxide-ion and electronic conduction, electronic conduction, mixed oxide-ion and hole conduction, or hole conduction. As described above, in the perovskite related compounds of the present invention, oxide ions diffuse around cations at the A site and the B site, exhibiting conduction. The optimization of this structure is expected to increase the oxide-ion conductivity.

Further, the perovskite related compounds of the present invention show physical properties such as lithium-ion conduction, various other ion conductions, proton conduction, electronic conduction, catalytic activity, photo-catalytic activity, dielectric property, magnetism, optical properties, and/or mechanical properties.

The oxide-ion conduction in the perovskite related compounds of the present invention is anisotropic. The preparation of thin films with the aligned crystal orientations leads to the fabrication of unique ion-conduction devices or unique ion/electron mixed conduction devices.

Since the perovskite related compounds of the present invention have the aforementioned physical properties, they are available for solid oxide fuel cells, sensors, batteries, electrodes, electrolytes, oxygen concentrators, oxygen separation membranes, oxygen permeable membranes, catalysts, photocatalysts, electric/electronic/communication apparatuses, energy/environmental apparatuses, and optical apparatuses.

Since the perovskite related compounds of the present invention can have high ion conductivity and/or high proton conductivity and can be electrochemically stable, they are available for:

electrolytes used in primary batteries, secondary batteries, and fuel cells, various electrochemical capacitors, dye sensitive solar cells, and other electrochemical devices with charge transfer carriers.

Owing to their ion conduction and/or proton conduction, the perovskite related compounds of the present invention are available for electrolytes of gas sensors and the like.

Gas sensors, gas detectors, or the like can be manufactured by attaching sensitive electrodes selected according to the gas to be detected to the electrolytes. For example, carbon-dioxide gas sensors can be manufactured by using sensitive electrodes containing carbonates. $NO_x$ sensors can be manufactured by using sensitive electrodes containing nitrates. Further, $SO_x$ sensors can be manufactured by using sensitive electrodes containing sulfates. Further, collecting apparatuses or decomposing apparatuses for $NO_x$, $SO_x$, and/or the like contained in exhaust gases can be manufactured by assembling electrolysis cells.

Further, the perovskite related compounds of the present invention including a lot of oxygen vacancies or anion vacancies in the material with the combination of ions are available as adsorbents or adsorption separating agents for ions or the like, or as various catalysts or the like.

Further, regarding the perovskite related compounds of the present invention, various rare earth elements used in the ion conductor can act as activators which form emission centers (color centers). In this case, the compounds are available as wavelength changing materials or the like.

Further, the perovskite related compounds of the present invention can have electron carrier properties, and can be superconductors.

All-solid electrochromic devices can also be fabricated by depositing inorganic compounds or the like which develop colors or change their colors by the absorption/desorption of conducive ions on the surface of the ion conductors consisting of the perovskite related compounds of the present invention, and by forming transparent electrodes such an ITO electrodes on the deposited surface of the ion conductors.

The use of these all-solid electrochromic devices enables the manufacture of electrochromic display devices with memory properties and with reduced power consumption.

EXAMPLES

Examples according to the present invention are shown below.

Examples 1-1 to 1-9

Sintered ceramic pellets with compositions shown in Table 1 were obtained by a solid-state reaction method using different starting materials.

Firstly, a $BaCO_3$ powder (purity: 99.9%), an $Nd_2O_3$ powder (purity: 99.95%), and an $In_2O_3$ powder (purity: 99.99%) were weighed and mixed so that the desired composition was obtained. The obtained mixed powder was calcined for eight hours at 1000° C. in air (solid-state reaction).

Next, the obtained calcined material was ground by a ball mill for 30 minutes. After wet mixing with ethanol and dry mixing were carried out over about two hours in total by using an agate mortar, pellets were obtained by uniaxial pressing. The obtained pellets were sintered for 24 hours at 1400° C.

The temperature program for the calcination and the sintering includes: (1) heating gradually from the room temperature to the desired temperature (1400° C. for sintering) for three hours, (2) maintaining at the desired temperature for the predetermined time period (24 hours for sintering), and (3) cooling gradually to 50° C. over three hours.

Table 4 shows the valences and the ionic radii (coordination number: 12) of Nd and Ba used in Examples 1-1 to 1-9 and those of rare earth elements and Sr used in Examples 2-1 to 2-6 and Examples 3-1 to 3-8 (which will be explained later).

<XRPD Measurement and Crystal Structure Analysis>

X-ray powder diffraction (XRPD) data were measured for each of the obtained samples.

The XRPD data were measured by Bruker D8 diffractometer using Cu Kα1/α2 radiation.

FIGS. 1A to 1I show the XRPD patterns of those examples.

Crystal structures were analyzed using the XRPD data which were obtained in the aforementioned processes. The data were indexed using the program Dicvol06, and the pattern fitting and extraction of integrated intensities were carried out by the Le Bail method using the program Fullprof. Then the structure determination was carried out by a Charge Flipping method using the program Superflip, followed by a structure refinement by the Rietveld method using the program RIETAN-FP.

Figure 2:
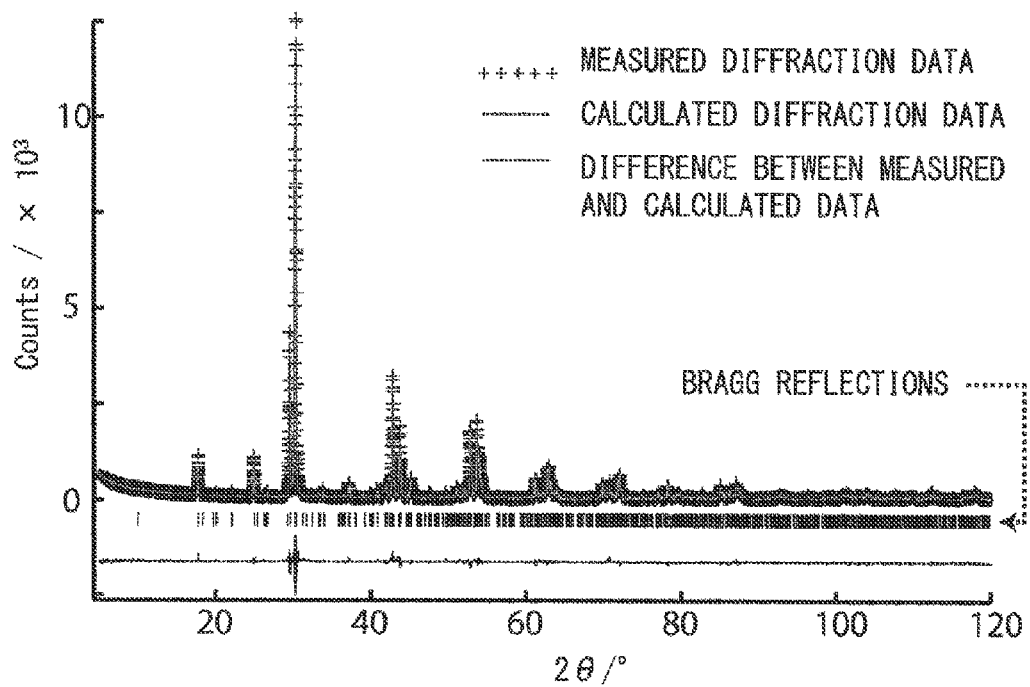
FIG. 2 shows the Rietveld analysis pattern of XRPD data of $NdBaInO_4$.

FIG. 2 shows the Rietveld analysis pattern of X-ray powder diffraction data of $NdBaInO_4$. The final Rietveld analysis gave the weighted reliability factor $R_{wp}=0.0981$ and the reliability factor of Bragg intensity $R_B=0.0356$.

Figure 3:
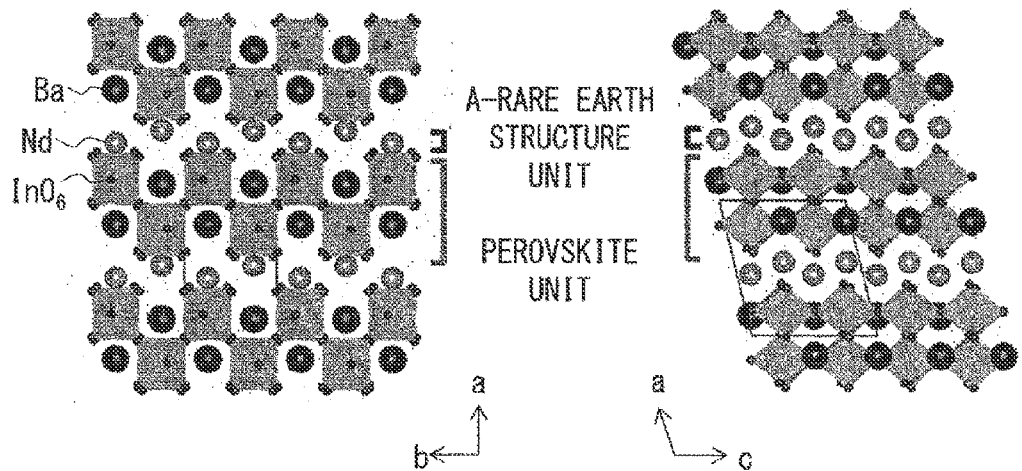
FIG. 3 shows the crystal structure of NdBaInO₄ refined by the Rietveld analysis.

FIG. 3 shows the refined crystal structure of $NdBaInO_4$. In the figure, the gray polyhedra represent $InO_6$ octahedra and the black solid box represent unit cell.

It has been found that the crystal structure of $NdBaInO_4$ consists of perovskite units ($Ba_{0.75}Nd_{0.25}InO_3$ units) and A-rare earth structure units (A-O units (Nd—O units in this example)). The perovskite unit ($Ba_{0.75}Nd_{0.25}InO_3$ unit) consists of $InO_6$ octahedra and six Ba ions and two Nd ions where $InO_6$ octahedra are surrounded by six Ba ions and two Nd ions. The A-rare earth structure unit (A-O units (Nd—O unit)) consists of Nd ion and seven oxide ions where Nd ion is coordinated by seven oxide ions. These two structural units are alternately arranged along the a-axis.

Figure 4:
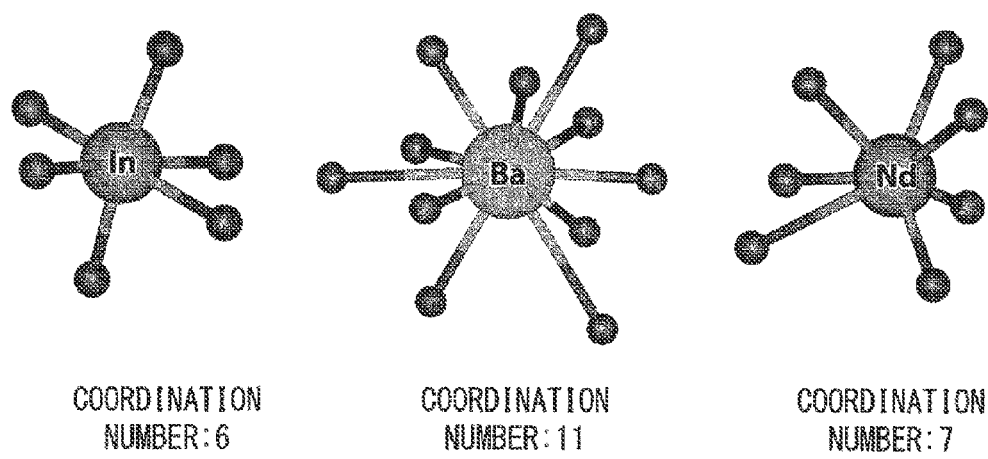
FIG. 4 shows the coordination environment and the coordination number of cations with oxide ions contained in NdBaInO₄.

FIG. 4 shows the coordination environments of cations in $NdBaInO_4$ and the coordination numbers of cations for oxide ions. In the figure, cations are labelled with element symbols, and the oxide ions are represented by spheres depicted around the cations.

The coordination number of the Nd ions for the oxide ions is seven, and the coordination number of the Ba ions for the oxide ions is eleven. Further, the coordination number of the In ions for the oxide ions is six.

The crystal system and space group of $NdBaInO_4$ are monoclinic $P2_1/c$.

It has also been found that crystal structures that are similar to the above-described structure and belong to the space group $P2_1/c$ were also formed in Examples 1-2 to 1-9 in which the Nd/Ba molar ratio was changed.

Table 1 also shows the lattice parameters of the samples obtained in Examples 1-1 to 1-9. Further, Table 2 shows corresponding reduced cell parameters.

In Examples 1-2 to 1-9 in which the Nd/Ba molar ratio was changed, the unit-cell volume of $Nd_xBa_{2-x}InO_{3.5+x/2}$ increased with an increase of the Ba concentration (2-x). This is because the ionic radius of Ba is larger than that of Nd. Further, the increase of the unit-cell parameters of $Nd_xBa_{2-x}InO_{3.5+x/2}$ according to the increase of the Ba concentration (2-x) was anisotropic and increment of the a-axis was higher than that of the other axes. $Nd_xBa_{2-x}InO_{3.5+x/2}$ have the alternating arrangement of the perovskite units and the A-rare earth structure units along the a-axis, therefore this direction would be easier to change its length than the others.

<Calculation of BVSs of Cations, Calculation of the Spatial Distribution of BVS of an Oxide Ion, and DFT Calculation>

The BVSs (Bond Valence Sums) of cations calculated based on the experimentally obtained crystal structure of $NdBaInO_4$ were 2.95 for Nd, 1.75 for Ba, and 3.00 for In.

The BVSs for each cation agree with its formal charge, indicating the validity of the refined crystal structure.

Figure 5:
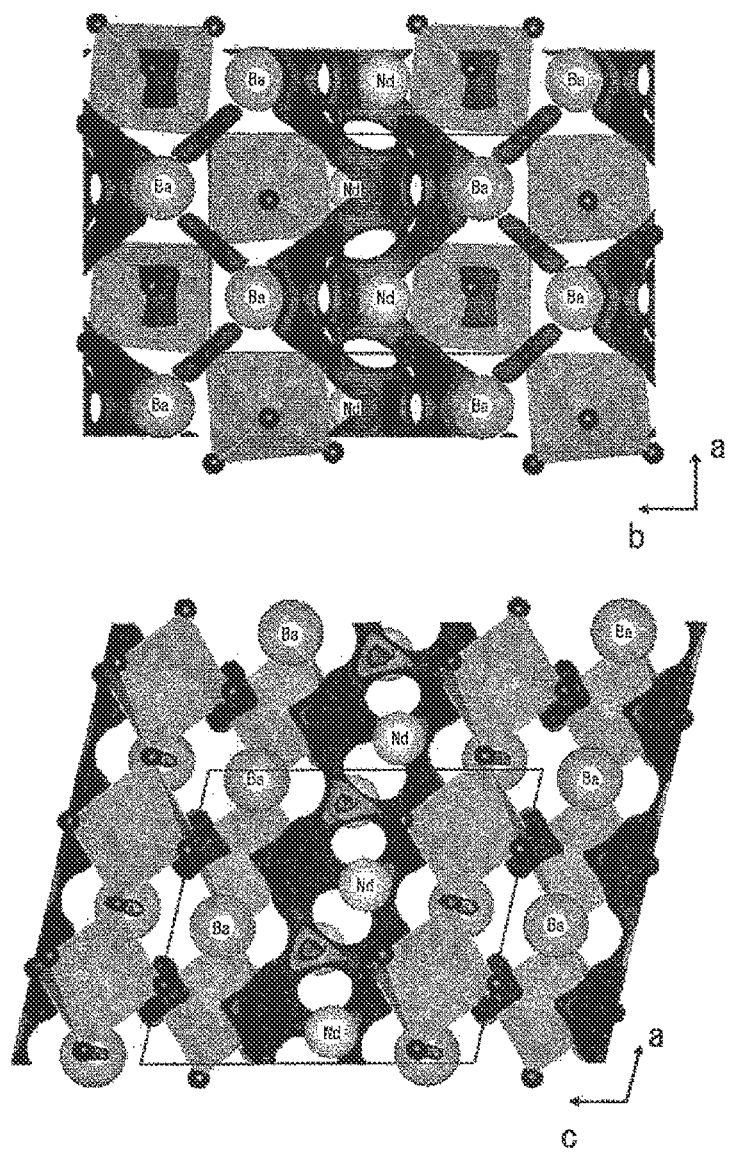
FIG. 5 shows a part of the crystal structure of NdBaInO₄ and the spatial distribution of BVS (Bond Valence Sums) for oxide ions.

Further, FIG. 5 shows the calculation result of the BVSs spatial distribution of the oxide ions for the crystal structure of $NdBaInO_4$. In FIG. 5, the black regions indicate isosurfaces on which the DBVS (difference between the ideal BVS (2) of the oxide ions and the BVS obtained by the calculation) of $NdBaInO_4$ is +0.2. FIG. 5 suggests that oxide ions would diffuse around Nd and In cations.

Therefore, the control of the structures of the A-rare earth structure units and the $BX_6$ octahedra can increase the oxide-ion conductivity.

The difference between the coordination numbers for the oxide ion among A, A' and B is due to the difference of the ion radii. The coordination numbers of the Ba ions (coordination number: 11) and the In ions (coordination number: 6) for the oxide ions were close to the coordination numbers for the perovskite-type $BaInO_{2.5}$ (the coordination numbers are 12 and 6 when the oxygen vacancies are not taken into account).

A large difference in the ionic radii between A and A' cations would lead to an ordering of A and A' sites giving a new perovskite related structure which is different from that of the $K_2NiF_4$-type (the coordination numbers of A and A' are both nine).

It has been found that the obtained structure is energetically more stable than $NdBaInO_4$ with the $K_2NiF_4$-type structure that is hypothetically created based on DFT (Density Functional Theory) calculation.

<Measurement of Total Electrical Conductivity and Oxide-Ion Conductivity>

Electrical conductivities of the samples obtained in Examples 1-1 to 1-7 (5 mm φ sintered pellets) were measured by a direct-current 4-probe method (400-1200° C.).

For the sample obtained in Example 1-1, the oxygen partial pressure $P(O_2)$ dependence of the total electrical conductivity at 850° C. was measured. For the sample obtained in Example 1-7, the oxygen partial pressure dependence of the total electrical conductivity at about 910° C. was measured. In these measurements, the oxygen partial pressure $P(O_2)$ was controlled within the range from 0.2 to $1.0 \times 10^{-21}$ atm.

FIGS. 6A and 6B show the Arrhenius plots of the total electrical conductivity ($\log(\sigma_{total}$ (S cm$^{-1}$))) of the samples obtained in Examples 1-1 and 1-7.

FIGS. 7A and 7B show the Arrhenius plots of the oxide-ion conductivity ($\log(\sigma_{ion}$ (S cm$^{-1}$))) of the samples obtained in Examples 1-1 and 1-7.

Figure 8A:
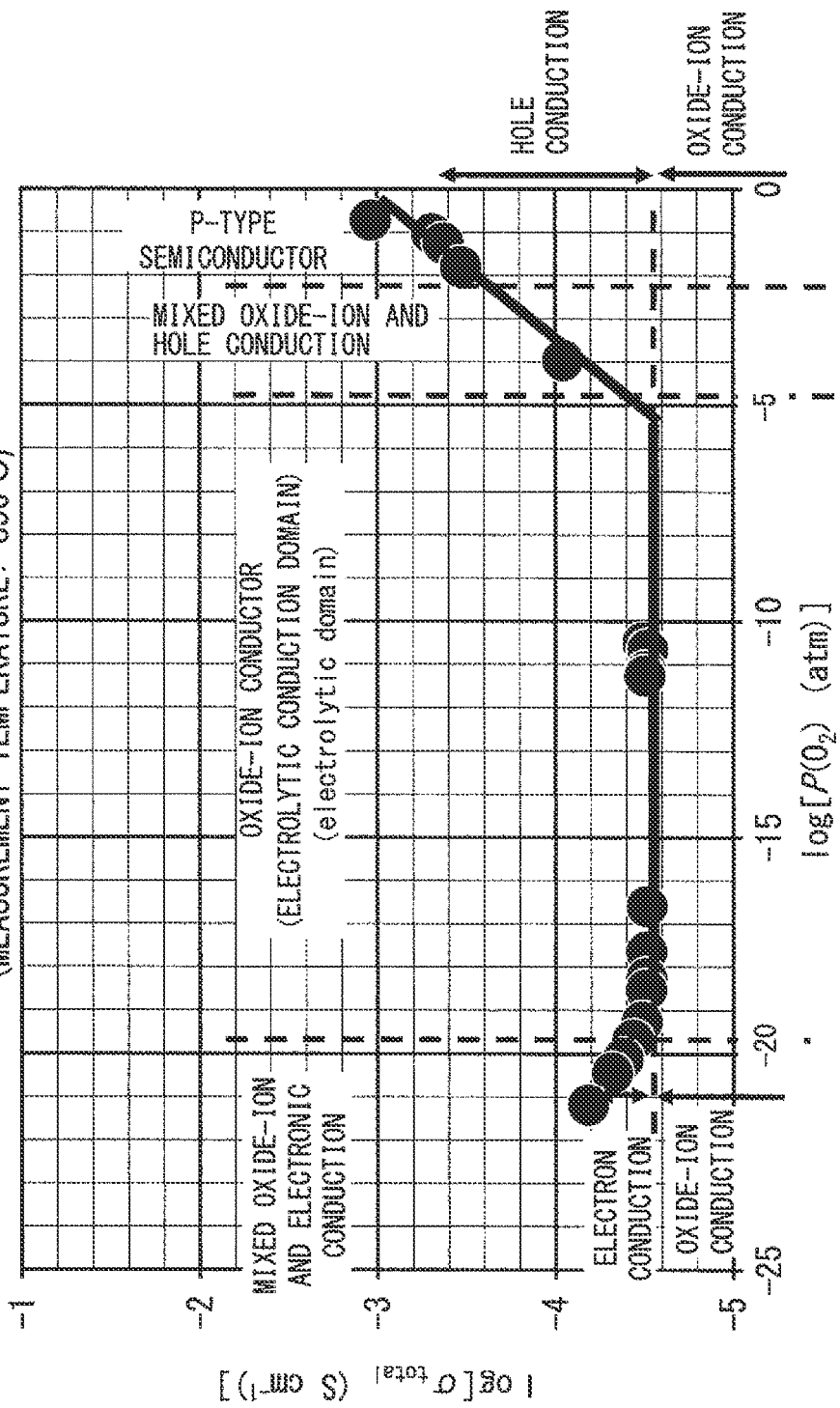
FIG. 8A shows the measurement result of the oxygen partial pressure P(O₂) dependence of the total electrical conductivity $\sigma_{total}$ of a sample obtained in Example 1-1 at 850° C.

FIG. 8A shows the oxygen partial pressure P(O$_2$) dependence of the total electrical conductivity of the sample obtained in Example 1-1 at 850° C. FIG. 8B shows the oxygen partial pressure P(O$_2$) dependence of the total electrical conductivity of the sample obtained in Example 1-7 at 910° C.

The sample obtained in Example 1-1 showed different conducting behaviors depending on the oxygen partial pressure. They became, as listed in the descending order of the oxygen partial pressure, a p-type semiconductor, a mixed oxide-ion and hole conductor, an oxide-ion conductor, and a mixed oxide-ion and electronic conductor. For the sample obtained in Example 1-1, the hole conduction was dominant in the region where the oxygen partial pressure was high, the oxide-ion conduction was dominant in the region where the oxygen partial pressure was intermediate, and the electronic conduction was dominant in the region where the oxygen partial pressure was low.

The sample obtained in Example 1-7 showed different conducting behaviors depending on the oxygen partial pressure. They became, as listed in the descending order of the oxygen partial pressure, a p-type semiconductor, a mixed oxide-ion and hole conductor, and an oxide-ion conductor. For the sample obtained in Example 1-7, the hole conduction was dominant in the region where the oxygen partial pressure was high and the oxide-ion conduction was dominant in the region where the oxygen partial pressure was intermediate or low.

Note that each boundary between conducting regions in FIGS. 8A and 8B is not precisely drawn and instead indicates a rough estimate.

The total electrical conductivities were also measured for other Examples in a manner similar to that for the above Examples and similar results were obtained.

Figure 9:
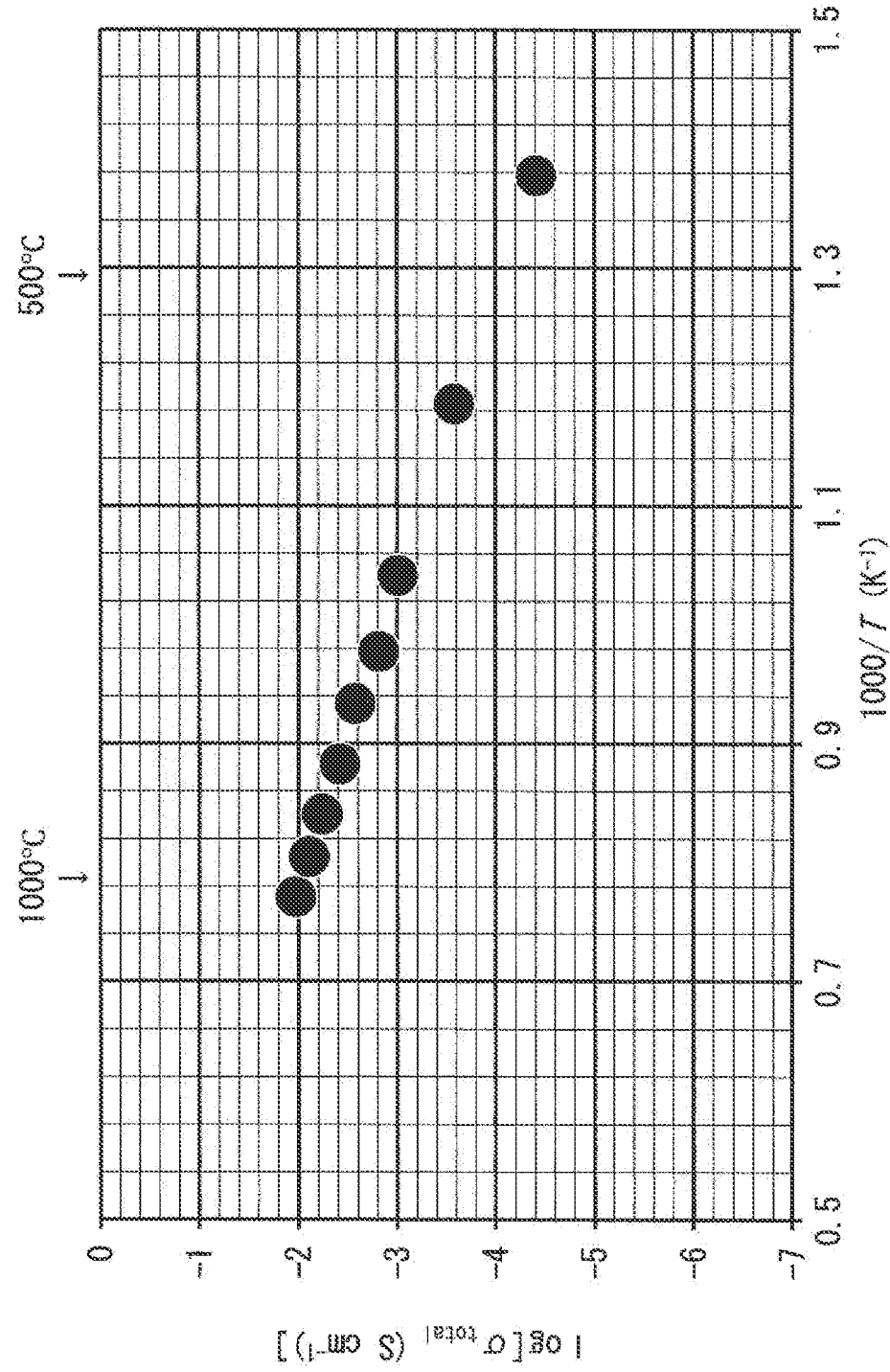
FIG. 9 shows the Arrhenius plot of the total electrical conductivity $\sigma_{total}$ of a sample obtained in Example 1-9.
Figure 11D:
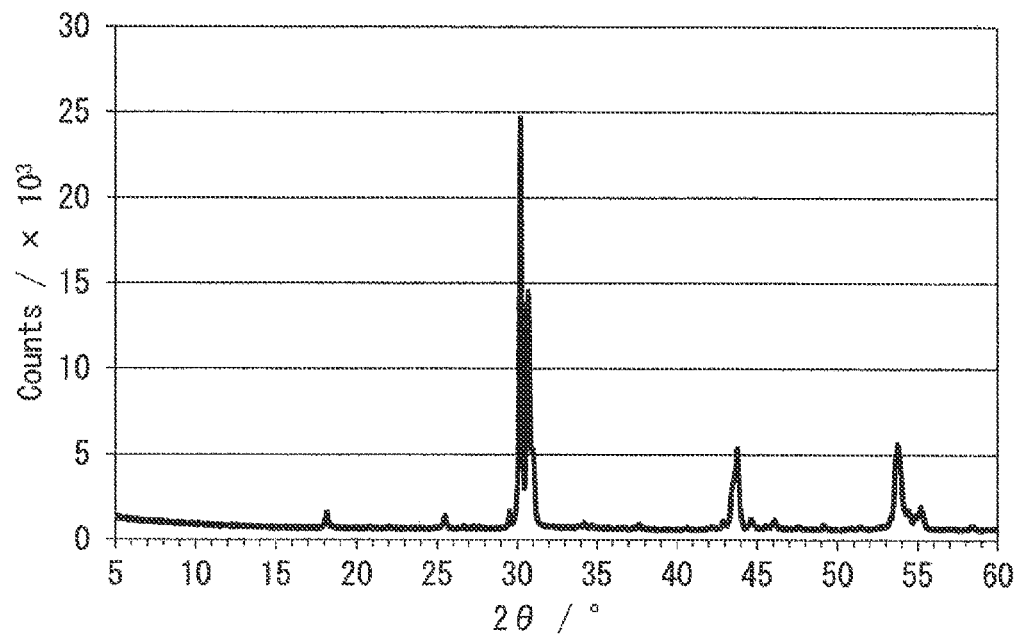
FIG. 11D shows the XRPD pattern of a sample obtained in Example 2-4.
Figure 11E:
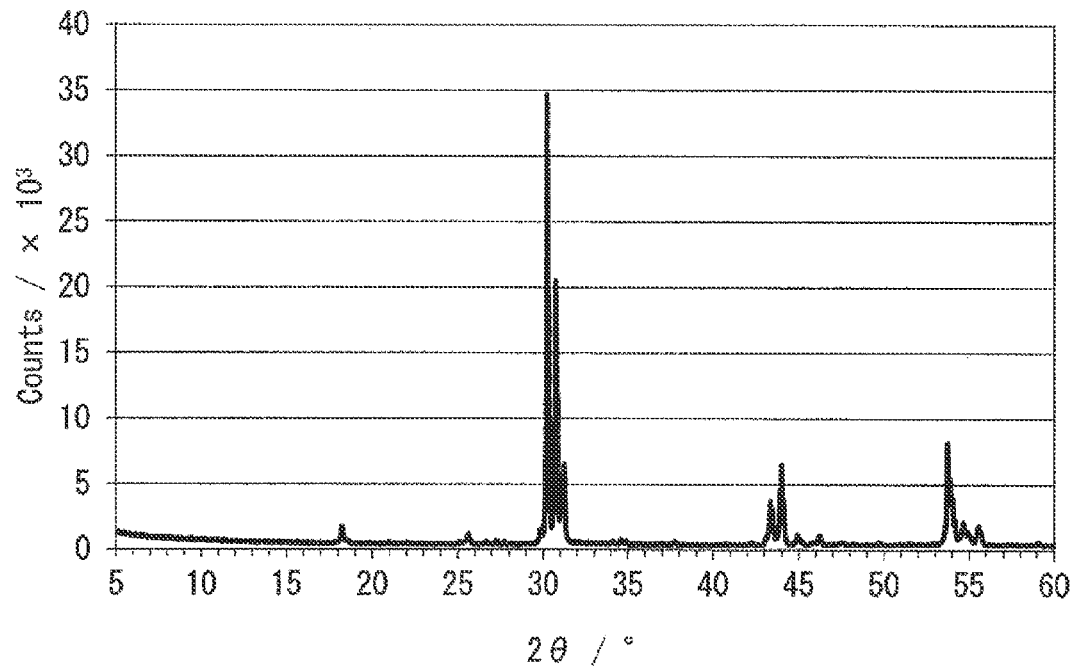
FIG. 11E shows the XRPD pattern of a sample obtained in Example 2-5.
Figure 11F:
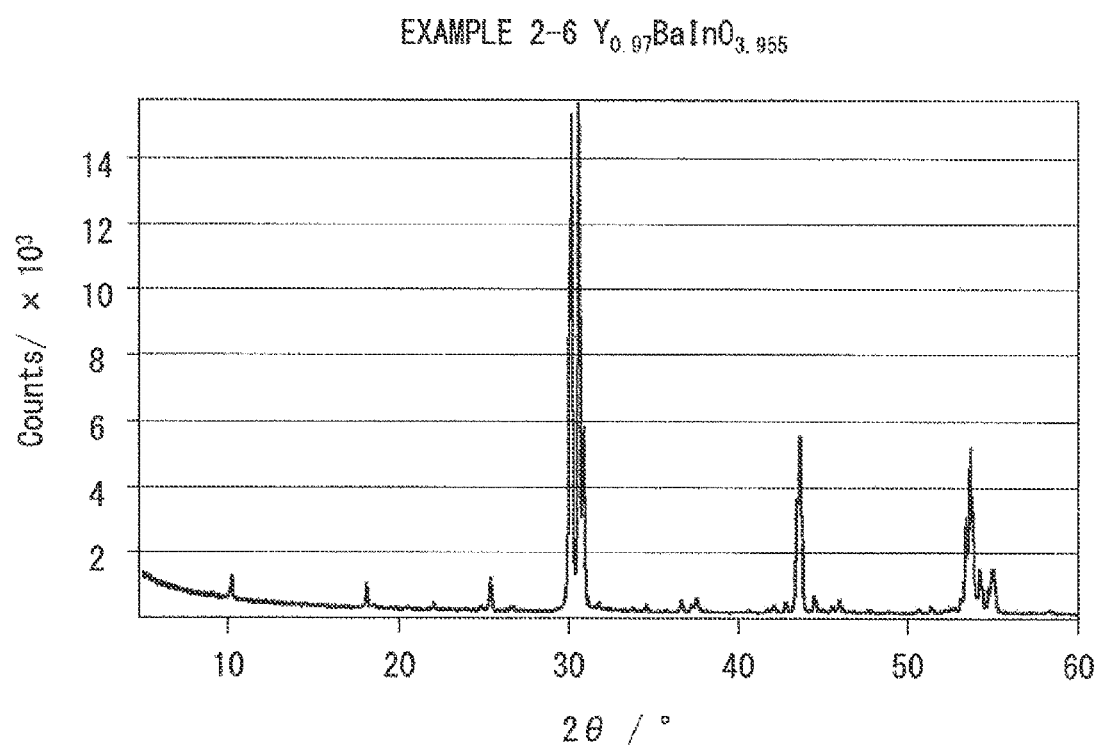
FIG. 11F shows the XRPD pattern of a sample obtained in Example 2-6.

As an example, FIG. 9 shows the Arrhenius plot of the total electrical conductivity of the sample obtained in Example 1-9.

Table 3 shows the measurement results of the total electrical conductivities and the oxide-ion conductivities at about 800 to 850° C. of the samples obtained in Examples 1-1 to 1-9. In some of the Examples, the total electrical conductivities or the oxide-ion conductivities were not measured. However, they are considered to be similar to the measured results.

Examples 2-1 to 2-6

Sintered ceramic pellets with compositions expressed by general formulas "RBaInO$_4$" and "R$_{1-x}$BaInO$_{4-3x/2}$" (where R is a rare earth element) were obtained in the same manner as that of Examples 1-1 to 1-9 using the different starting materials and the different molar ratios for the starting materials. Table 1 shows the composition of each example. In these examples, R was selected from a rare earth element with an ionic radius smaller than that of Nd, so that the ionic radius ratio of Ba to that of R was larger than those in Examples 1-1 to 1-9.

Note that following materials are used as starting materials for the Examples 2-1 to 2-6 in addition to the starting materials used in the Examples 1-1 to 1-9:
Sm$_2$O$_3$ powder (purity: 99.9%),
Y$_2$O$_3$ powder (purity: 99.99%),
Ho$_2$O$_3$ powder (purity: 99.95%),
Er$_2$O$_3$ powder (purity: 99.9%), and
Yb$_2$O$_3$ powder (purity: 99.9%).

<XRPD Measurement and Crystal Structure Analysis>

Similarly to Examples 1-1 to 1-9, the XRPD measurement and crystal structure analysis were carried out for each of the obtained samples.

FIGS. 11A to 11F show the XRPD patterns of those examples.

Similarly to Examples 1-1 to 1-9, all obtained materials have the space group P2$_1$/c with monoclinic system.

Based on the crystal structure analysis of RBaInO$_4$ and R$_{1-x}$BaInO$_{4-3x/2}$, it has been found that similarly to Examples 1-1 to 1-9, the crystal structures consist of the alternating arrangement of perovskite units and A-rare earth structure units along the a-axis regardless of rare earth element R.

Table 1 shows the lattice parameters of each sample. Further, Table 2 shows corresponding reduced cell parameters.

These analyses have confirmed that the unit-cell volume decreases with the decrease of the ionic radius of the rare earth element R. Further, it has been found that the rate of the decease of the a-axis length against the decrease of the ionic radius of the rare earth element R is larger than those of the other axis lengths. This phenomenon is considered to be caused by the contraction of the A-rare earth structure unit as the ionic radius of the rare earth element R decreases.

FIG. 10 shows the relation between the ionic radius of the rare earth element (coordination number: 12) and the unit-cell volume V.

Because the samples obtained in Examples 2-1 to 2-6 have layered structures similar to those of Example 1-1, these samples are considered to exhibit hole conduction, mixed oxide-ion and hole conduction, oxide-ion conduction, mixed oxide-ion and electronic conduction, or electronic conduction as in the case of Example 1-1.

Further, the vacancies at the A sites of AA'BO$_4$ in Example 2-6 are expected to improve the material properties.

<Measurement of Total Electrical Conductivity and Oxide-Ion Conductivity>

For Examples 2-1 to 2-6, the total electrical conductivities and the oxide-ion conductivities were measured as in the case of Examples 1-1 and 1-7, and similar results were obtained. FIGS. 12A to 12C and Table 3 show the measurement results. In some of the Examples, the total electrical conductivities or the oxide-ion conductivities were not measured. However, they are considered to be similar to the measured results of other compositions.

Figure 13:
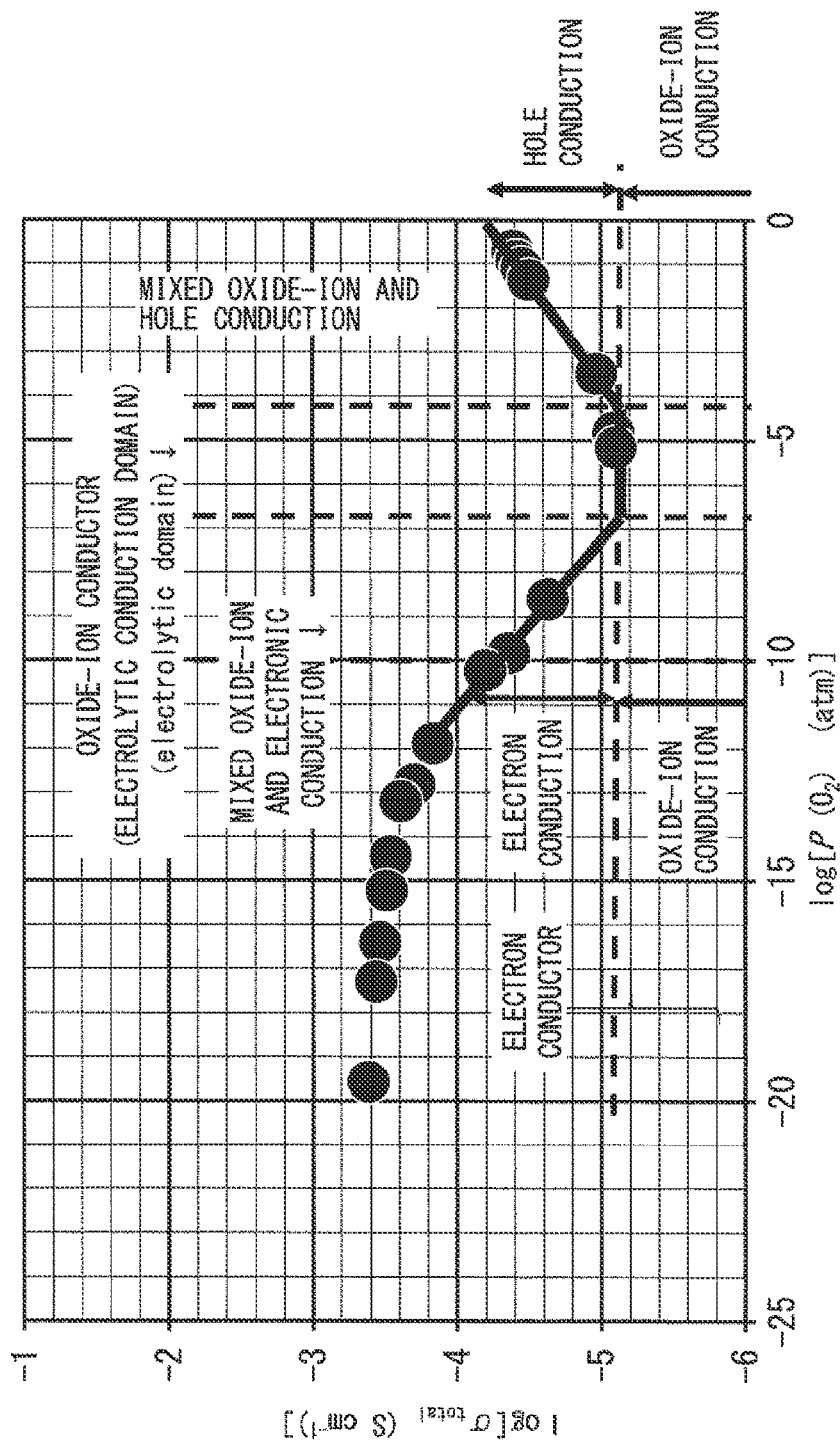
FIG. 13 shows the measurement result of the oxygen partial pressure P(O₂) dependence of the total electrical conductivity $\sigma_{total}$ of a sample obtained in Example 2-6 at 957° C.
Figure 14A:
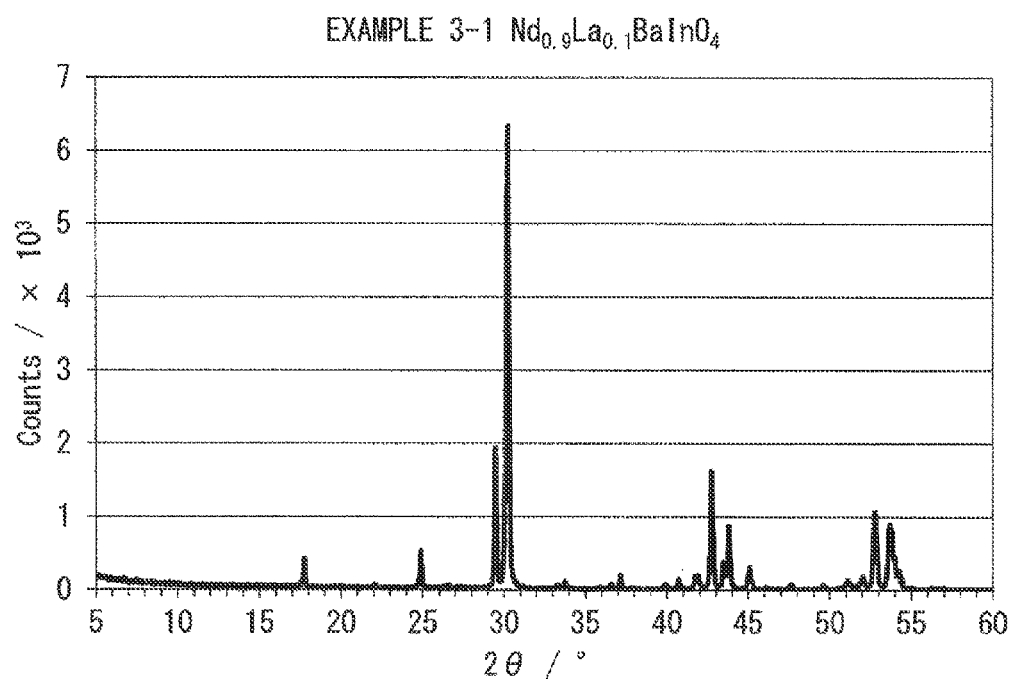
FIG. 14A shows the X-ray powder diffraction (XRPD) pattern of a sample obtained in Example 3-1.
Figure 14B:
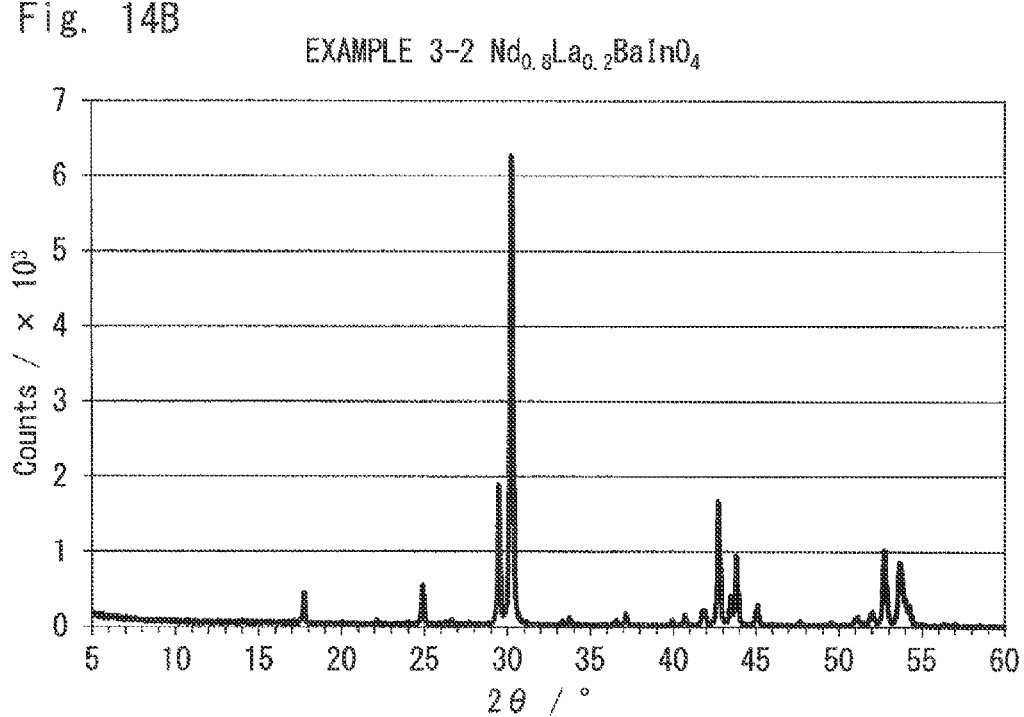
FIG. 14B shows the XRPD pattern of a sample obtained in Example 3-2.
Figure 14C:
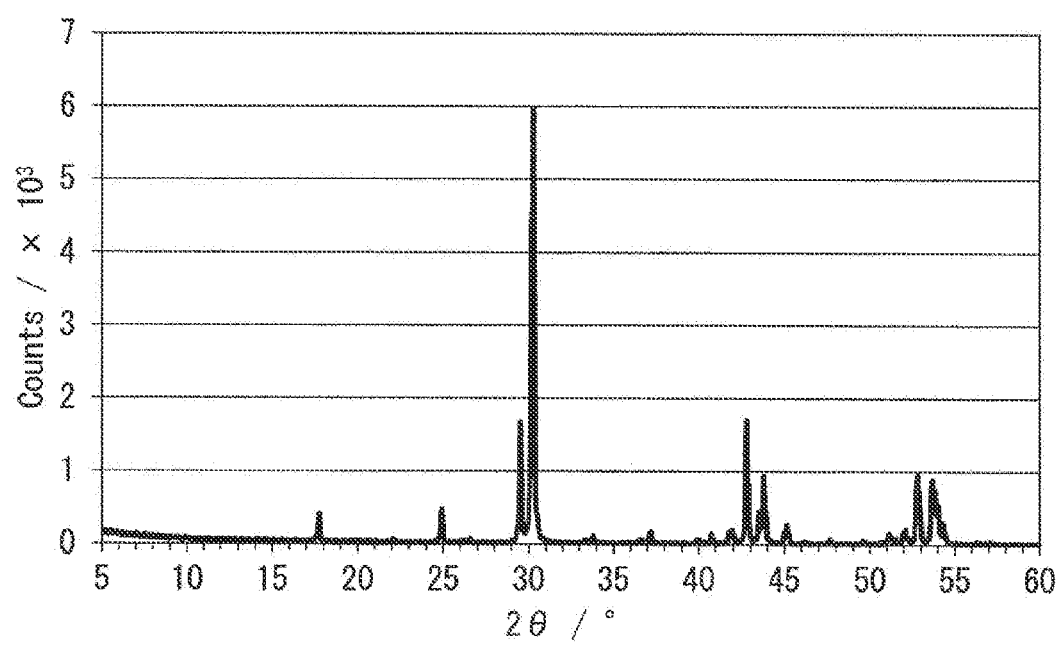
FIG. 14C shows the XRPD pattern of a sample obtained in Example 3-3.
Figure 14D:
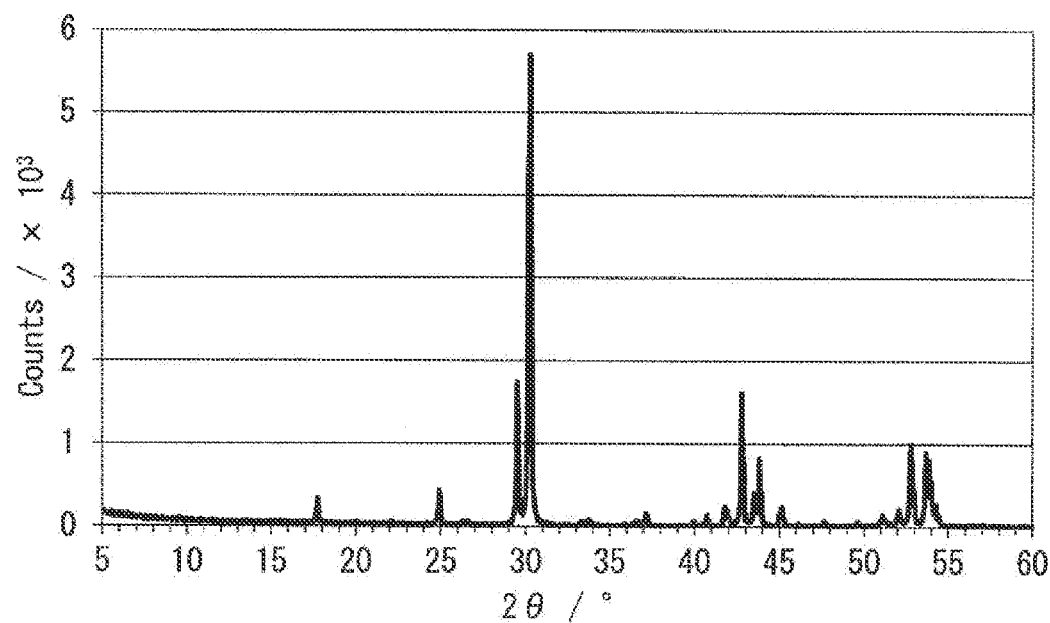
FIG. 14D shows the XRPD pattern of a sample obtained in Example 3-4.
Figure 14E:
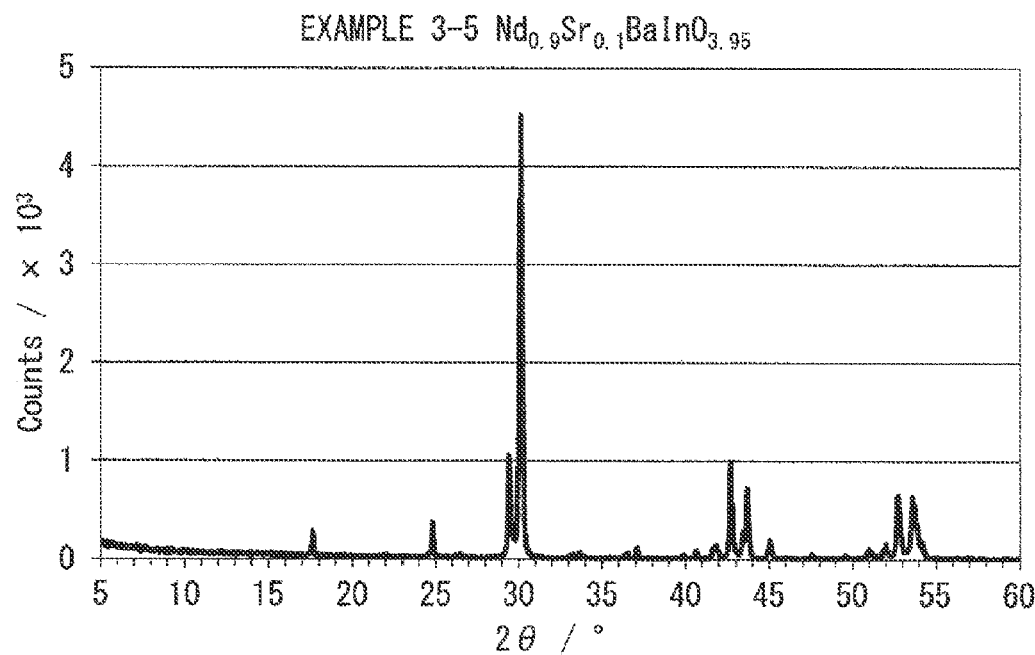
FIG. 14E shows the XRPD pattern of a sample obtained in Example 3-5.
Figure 14F:
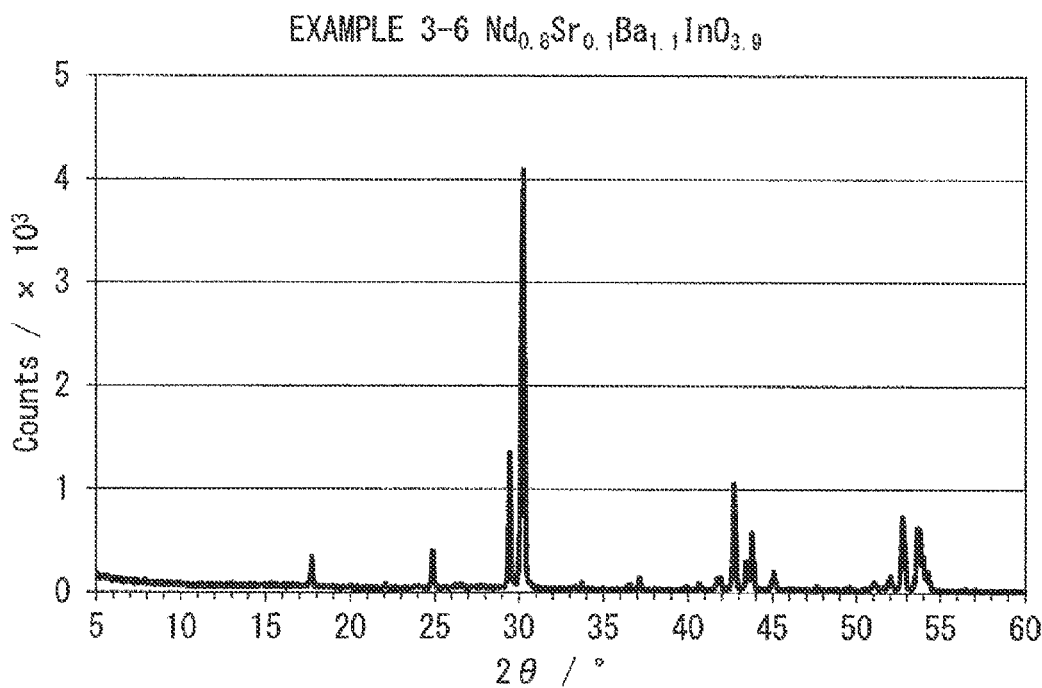
FIG. 14F shows the XRPD pattern of a sample obtained in Example 3-6.
Figure 15B:
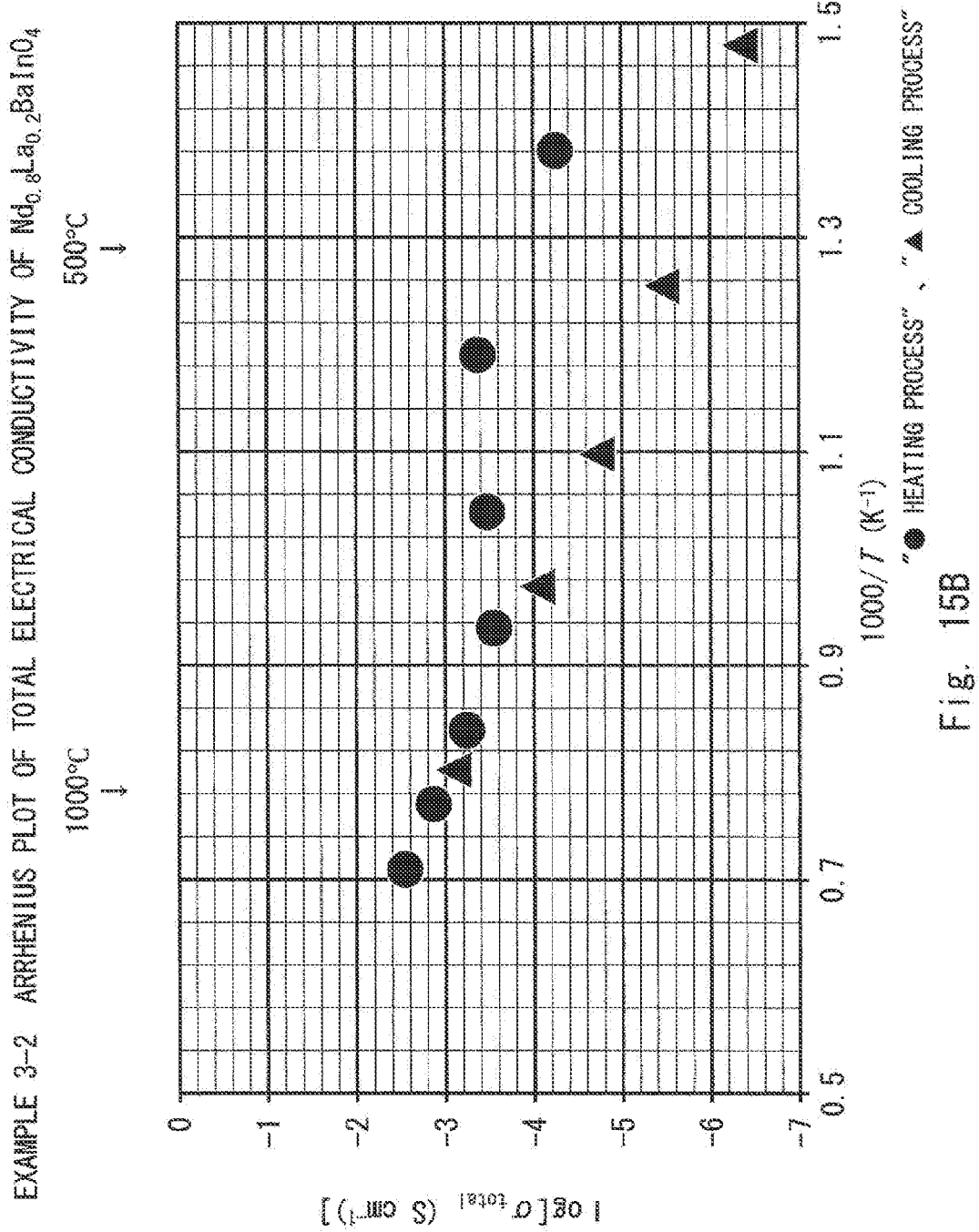
FIG. 15B shows the Arrhenius plot of the total electrical conductivity $\sigma_{total}$ of a sample obtained in Example 3-2.
Figure 15D:
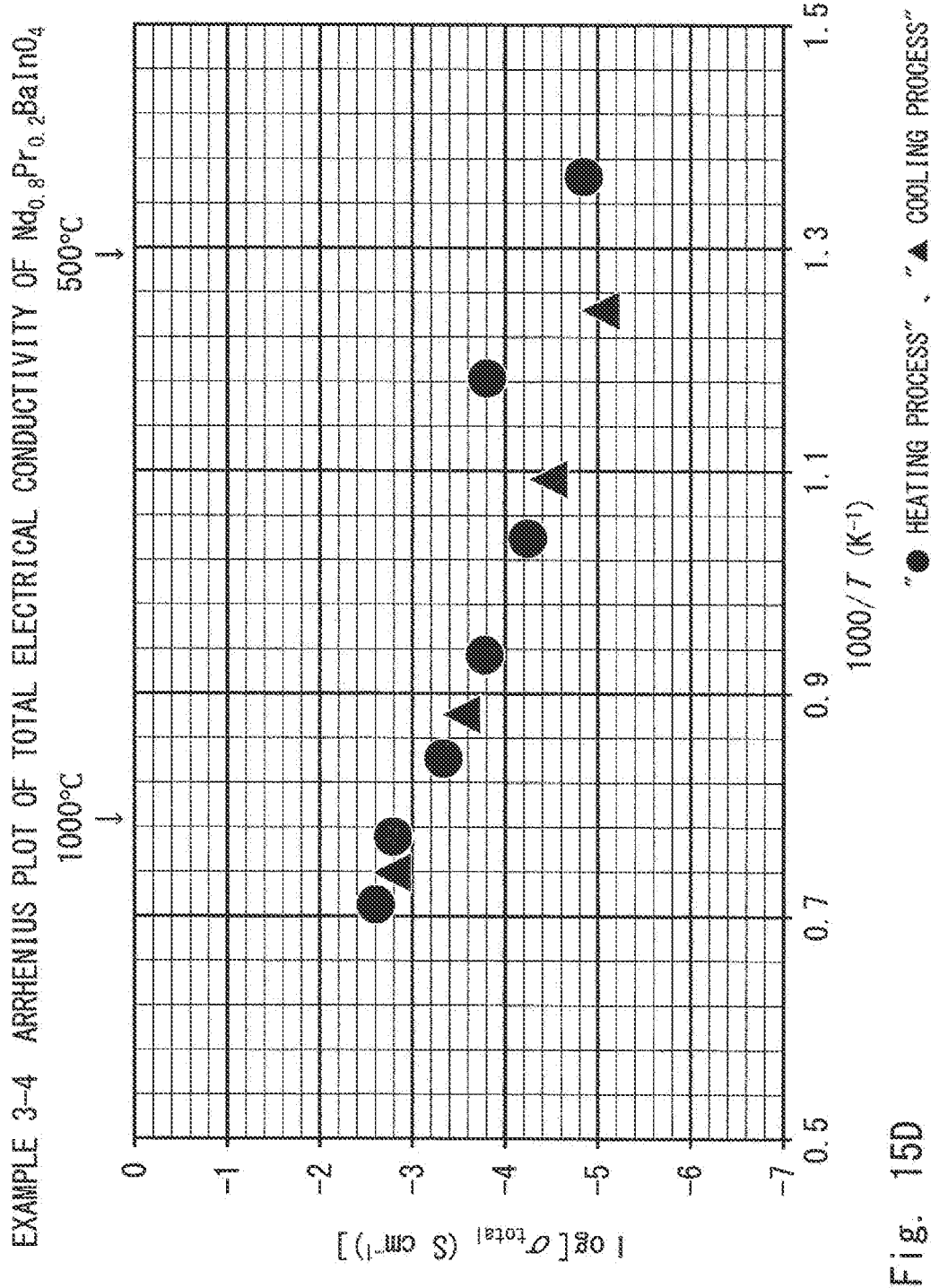
FIG. 15D shows the Arrhenius plot of the total electrical conductivity $\sigma_{total}$ of a sample obtained in Example 3-4.

Further, for the samples obtained in Examples 2-1 to 2-6, the oxygen partial pressure P(O$_2$) dependence of the total electrical conductivity at 957° C. was measured as in the case of Examples 1-1 and 1-7. FIG. 13 shows the measurement result.

The sample obtained in Example 2-6 showed different conducting behaviors depending on the oxygen partial pressure. They became, as listed in the descending order of the oxygen partial pressure, a mixed oxide-ion and hole conductor, an oxide-ion conductor, a mixed oxide-ion and electronic conductor, and an electron conductor. For the sample obtained in Example 2-6, the hole conduction was dominant in the region where the oxygen partial pressure is high and the oxide-ion conduction was dominant in the region where the oxygen partial pressure is intermediate. Further, the electronic conduction was dominant in the region where the oxygen partial pressure is low.

Note that the boundaries between each conducting behavior in FIG. 13 are not precisely drawn and but roughly estimated.

Examples 3-1 to 3-8

Sintered ceramic pellets with compositions shown in Table 1 were obtained in the same manner as that of Example 1-1 using the different starting materials and/or the different molar ratios for the starting materials. Table 1 also shows the composition of each example. In these examples, $NdBaInO_4$ of Example 1-1 was used as a mother material and a part of the Nd ions were replaced with other ions with an ionic radius larger than that of Nd (La ions, Pr ions, Sr ions, or Ba ions) or a combination thereof.

Note that the following materials are used as starting materials for the Examples 2-1 to 2-6 in addition to the starting materials used in the Examples 1-1 to 1-9:
$La_2O_3$ powder (purity: 99.9%),
$Pr_6O_{11}$ powder (purity: 99.95%), and
$SrCO_3$ powder (purity: 99.9%).
$La_2O_3$ was heated to 200° C. to remove absorbed water before weigh.

<XRPD Measurement and Crystal Structure Analysis>

Similarly to Examples 1-1 to 1-9, the XRPD measurement and crystal structure analysis were carried out for each of the obtained samples.

FIGS. 14A to 14F show the XRPD patterns of those examples.

Similarly to Examples 1-1 to 1-9, all obtained materials have the space group $P2_1/c$ with monoclinic system.

Based on the crystal structure analysis, it has been found that similarly to Examples 1-1 to 1-9, crystal structures consist of the alternating arrangement of perovskite units and A-rare earth structure units along the a-axis.

Table 1 shows the lattice parameters of each sample. Further, Table 2 shows corresponding reduced cell parameters.

Because the samples obtained in Examples 3-1 to 3-8 have layered structures similar to that of Example 1-1, these samples are considered to exhibit hole conduction, mixed oxide-ion and hole conduction, oxide-ion conduction, mixed oxide-ion and electronic conduction, or electronic conduction as in the case of Example 1-1.

<Measurement of Total Electrical Conductivity and Oxide-Ion Conductivity>

For Examples 3-1 to 3-8, the total electrical conductivities and the oxide-ion conductivities were measured as in the case of Examples 1-1 and 1-7, and similar results were obtained. FIGS. 15A to 15E and Table 3 show the characterized results. In some of the Examples, the total electrical conductivities were not measured. However, they are considered to be similar to the measured results.

Figure 16A:
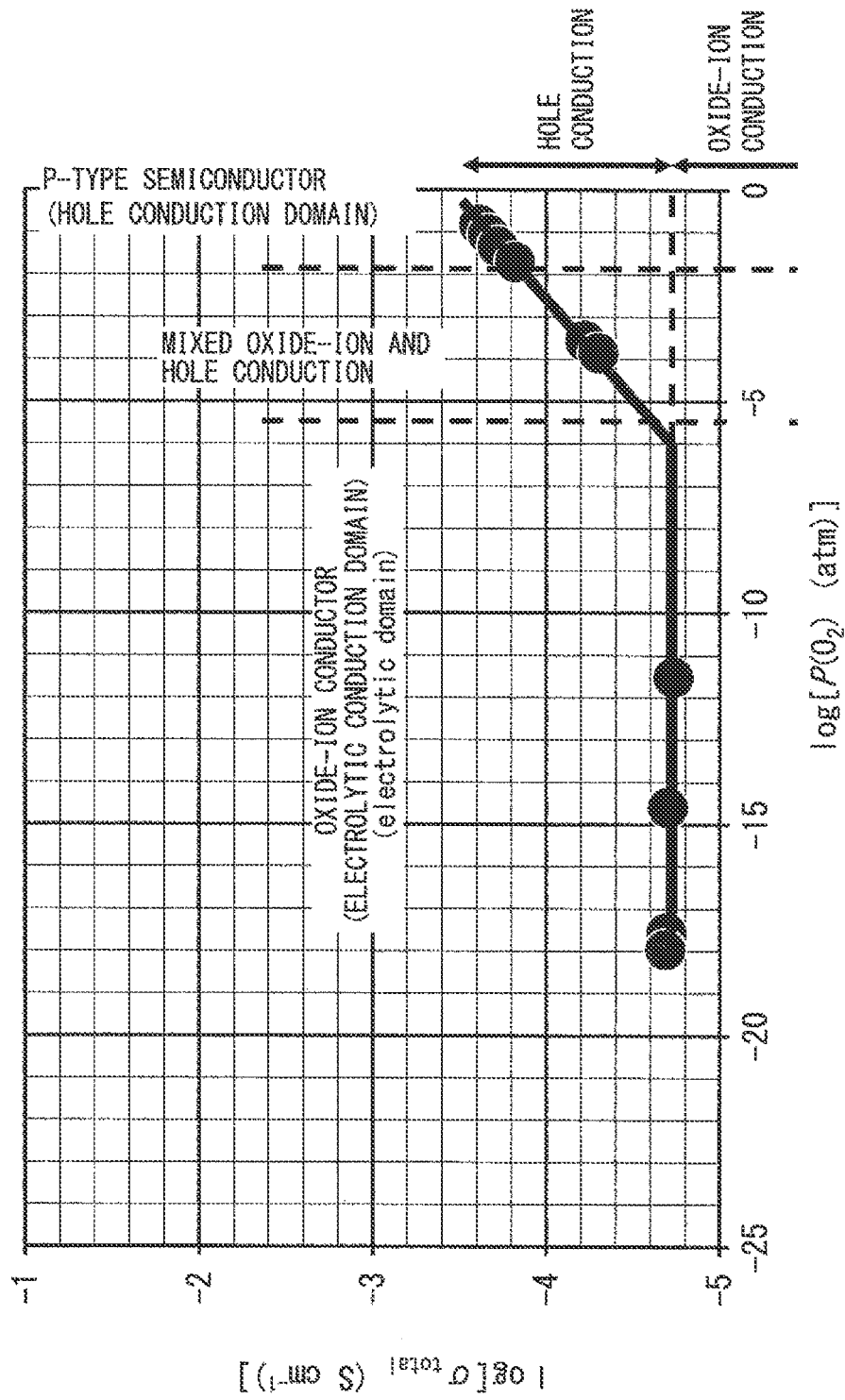
FIG. 16A shows the measurement result of the oxygen partial pressure P(O₂) dependence of the total electrical conductivity $\sigma_{total}$ of a sample obtained in Example 3-1 at 852° C.

For the sample obtained in Example 3-1, the oxygen partial pressure $P(O_2)$ dependence of the total electrical conductivity at 852° C. was measured as in the case of Examples 1-1 and 1-7. FIG. 16A shows the measurement result.

Further, for the sample obtained in Example 3-3, the oxygen partial pressure $P(O_2)$ dependence of the total electrical conductivity at 851° C. was measured as in the case of Examples 1-1 and 1-7. FIG. 16B shows the measurement result.

Similarly to Example 1-7, the samples obtained in Examples 3-1 and 3-3 showed different conducting behaviors depending on the oxygen partial pressure. They became, as listed in the descending order of the oxygen partial pressure, a p-type conductor, a mixed oxide-ion and hole conductor, and an oxide-ion conductor. For the samples obtained in Examples 3-1 and 3-3, the hole conduction was dominant in the region where the oxygen partial pressure is high and the oxide-ion conduction was dominant in the region where the oxygen partial pressure is intermediate or low.

Note that the boundaries between each conducting behavior in FIGS. 16A and 16B are not precisely drawn and but roughly estimated.

TABLE 1

| | Composition | Lattice parameters | | | | | | |
| --- | --- | --- | --- | --- | --- | --- | --- | --- |
| | | a [Å] | b [Å] | c [Å] | α [°] | β [°] | γ [°] | V [Å³] |
| Example 1-1 | $NdBaInO_4$ | 9.10 | 6.05 | 8.26 | 90 | 103.40 | 90 | 441.88 |
| Example 1-2 | $Nd_{1.05}Ba_{0.95}InO_{4.025}$ | 9.09 | 6.05 | 8.27 | 90 | 103.44 | 90 | 441.88 |
| Example 1-3 | $Nd_{1.04}Ba_{0.96}InO_{4.02}$ | 9.09 | 6.05 | 8.27 | 90 | 103.43 | 90 | 441.65 |
| Example 1-4 | $Nd_{1.03}Ba_{0.97}InO_{4.015}$ | 9.09 | 6.05 | 8.27 | 90 | 103.44 | 90 | 442.14 |
| Example 1-5 | $Nd_{1.02}Ba_{0.98}InO_{4.01}$ | 9.09 | 6.05 | 8.26 | 90 | 103.43 | 90 | 442.05 |
| Example 1-6 | $Nd_{1.01}Ba_{0.99}InO_{4.005}$ | 9.10 | 6.05 | 8.26 | 90 | 103.43 | 90 | 442.49 |
| Example 1-7 | $Nd_{0.9}Ba_{1.1}InO_{3.95}$ | 9.10 | 6.06 | 8.26 | 90 | 103.42 | 90 | 443.21 |
| Example 1-8 | $Nd_{0.8}Ba_{1.2}InO_{3.9}$ | 9.11 | 6.06 | 8.27 | 90 | 103.45 | 90 | 443.98 |
| Example 1-9 | $Nd_{0.85}Ba_{1.15}InO_{3.925}$ | 9.11 | 6.06 | 8.27 | 90 | 103.45 | 90 | 443.30 |
| Example 2-1 | $SmBaInO_4$ | 9.05 | 6.01 | 8.26 | 90 | 103.74 | 90 | 436.71 |
| Example 2-2 | $YBaInO_4$ | 8.96 | 5.95 | 8.32 | 90 | 104.44 | 90 | 429.44 |
| Example 2-3 | $HoBaInO_4$ | 8.96 | 5.95 | 8.32 | 90 | 104.42 | 90 | 429.40 |
| Example 2-4 | $ErBaInO_4$ | 8.95 | 5.93 | 8.34 | 90 | 104.56 | 90 | 428.46 |
| Example 2-5 | $YbBaInO_4$ | 8.88 | 5.91 | 8.35 | 90 | 104.78 | 90 | 423.79 |
| Example 2-6 | $Y_{0.97}BaInO_{3.955}$ | 8.96 | 5.94 | 8.33 | 90 | 104.55 | 90 | 429.55 |
| Example 3-1 | $Nd_{0.9}La_{0.1}BaInO_4$ | 9.11 | 6.06 | 8.26 | 90 | 103.39 | 90 | 443.12 |
| Example 3-2 | $Nd_{0.8}La_{0.2}BaInO_4$ | 9.12 | 6.06 | 8.26 | 90 | 103.34 | 90 | 444.46 |
| Example 3-3 | $Nd_{0.9}Pr_{0.1}BaInO_4$ | 9.09 | 6.05 | 8.26 | 90 | 103.42 | 90 | 441.58 |
| Example 3-4 | $Nd_{0.8}Pr_{0.2}BaInO_4$ | 9.09 | 6.05 | 8.26 | 90 | 103.42 | 90 | 441.69 |
| Example 3-5 | $Nd_{0.9}Sr_{0.1}BaInO_{3.95}$ | 9.10 | 6.05 | 8.26 | 90 | 103.40 | 90 | 442.19 |
| Example 3-6 | $Nd_{0.8}Sr_{0.1}Ba_{1.1}InO_{3.9}$ | 9.10 | 6.05 | 8.27 | 90 | 103.38 | 90 | 442.57 |
| Example 3-7 | $Nd_{0.8}Sr_{0.2}BaInO_{3.9}$ | 9.13 | 6.03 | 8.27 | 90 | 103.35 | 90 | 442.89 |
| Example 3-8 | $Nd_{0.7}Sr_{0.3}BaInO_{3.85}$ | 9.10 | 6.04 | 8.27 | 90 | 103.18 | 90 | 441.95 |

TABLE 2

| | | Reduced cell parameters | | | | | |
|---|---|---|---|---|---|---|---|
| | Composition | $a_r$ [Å] | $b_r$ [Å] | $c_r$ [Å] | $\alpha_r$ [°] | $\beta_r$ [°] | $\gamma_r$ [°] |
| Example 1-1 | $NdBaInO_4$ | 6.05 | 8.26 | 9.10 | 103.40 | 90 | 90 |
| Example 1-2 | $Nd_{1.05}Ba_{0.95}InO_{4.025}$ | 6.05 | 8.27 | 9.09 | 103.44 | 90 | 90 |
| Example 1-3 | $Nd_{1.04}Ba_{0.96}InO_{4.02}$ | 6.05 | 8.27 | 9.09 | 103.43 | 90 | 90 |
| Example 1-4 | $Nd_{1.03}Ba_{0.97}InO_{4.015}$ | 6.05 | 8.27 | 9.09 | 103.44 | 90 | 90 |
| Example 1-5 | $Nd_{1.02}Ba_{0.98}InO_{4.01}$ | 6.05 | 8.26 | 9.09 | 103.43 | 90 | 90 |
| Example 1-6 | $Nd_{1.01}Ba_{0.99}InO_{4.005}$ | 6.05 | 8.26 | 9.10 | 103.43 | 90 | 90 |
| Example 1-7 | $Nd_{0.9}Ba_{1.1}InO_{3.95}$ | 6.06 | 8.26 | 9.10 | 103.42 | 90 | 90 |
| Example 1-8 | $Nd_{0.8}Ba_{1.2}InO_{3.9}$ | 6.06 | 8.27 | 9.11 | 103.45 | 90 | 90 |
| Example 1-9 | $Nd_{0.85}Ba_{1.15}InO_{3.925}$ | 6.05 | 8.27 | 9.11 | 103.42 | 90 | 90 |
| Example 2-1 | $SmBaInO_4$ | 6.01 | 8.26 | 9.05 | 103.74 | 90 | 90 |
| Example 2-2 | $YBaInO_4$ | 5.95 | 8.32 | 8.96 | 104.44 | 90 | 90 |
| Example 2-3 | $HoBaInO_4$ | 5.95 | 8.32 | 8.96 | 104.42 | 90 | 90 |
| Example 2-4 | $ErBaInO_4$ | 5.93 | 8.34 | 8.95 | 104.56 | 90 | 90 |
| Example 2-5 | $YbBaInO_4$ | 5.91 | 8.35 | 8.88 | 104.78 | 90 | 90 |
| Example 2-6 | $Y_{0.97}BaInO_{3.955}$ | 5.94 | 8.33 | 8.96 | 104.551 | 90 | 90 |
| Example 3-1 | $Nd_{0.9}La_{0.1}BaInO_4$ | 6.06 | 8.26 | 9.11 | 103.39 | 90 | 90 |
| Example 3-2 | $Nd_{0.8}La_{0.2}BaInO_4$ | 6.06 | 8.26 | 9.12 | 103.34 | 90 | 90 |
| Example 3-3 | $Nd_{0.9}Pr_{0.1}BaInO_4$ | 6.05 | 8.26 | 9.09 | 103.42 | 90 | 90 |
| Example 3-4 | $Nd_{0.8}Pr_{0.2}BaInO_4$ | 6.05 | 8.26 | 9.09 | 103.42 | 90 | 90 |
| Example 3-5 | $Nd_{0.9}Sr_{0.1}BaInO_{3.95}$ | 6.05 | 8.26 | 9.10 | 103.40 | 90 | 90 |
| Example 3-6 | $Nd_{0.8}Sr_{0.1}Ba_{1.1}InO_{3.9}$ | 6.05 | 8.27 | 9.10 | 103.38 | 90 | 90 |
| Example 3-7 | $Nd_{0.8}Sr_{0.2}BaInO_{3.9}$ | 6.03 | 8.27 | 9.13 | 103.349 | 90 | 90 |
| Example 3-8 | $Nd_{0.7}Sr_{0.3}BaInO_{3.85}$ | 6.04 | 8.27 | 9.10 | 103.182 | 90 | 90 |

TABLE 3

| | Composition | Total electrical conductivity $\log(\sigma_{total}$ (S cm$^{-1}$)) | Oxide-ion conductivity $\log(\sigma_{ion}$ (S cm$^{-1}$)) |
|---|---|---|---|
| Example 1-1 | $NdBaInO_4$ | −3.28 at 853° C. | −4.64 at 854° C. |
| Example 1-2 | $Nd_{1.05}Ba_{0.95}InO_{4.025}$ | | |
| Example 1-3 | $Nd_{1.04}Ba_{0.96}InO_{4.02}$ | | |
| Example 1-4 | $Nd_{1.03}Ba_{0.97}InO_{4.015}$ | −3.78 at 856° C. | |
| Example 1-5 | $Nd_{1.02}Ba_{0.98}InO_{4.01}$ | −3.80 at 848° C. | |
| Example 1-6 | $Nd_{1.01}Ba_{0.99}InO_{4.005}$ | −3.47 at 853° C. | |
| Example 1-7 | $Nd_{0.9}Ba_{1.1}InO_{3.95}$ | −2.31 at 855° C. | −3.51 at 810° C. |
| Example 1-8 | $Nd_{0.8}Ba_{1.2}InO_{3.9}$ | | |
| Example 1-9 | $Nd_{0.85}Ba_{1.15}InO_{3.925}$ | −2.57 at 798° C. | |
| Example 2-1 | $SmBaInO_4$ | −5.93 at 803° C. | |
| Example 2-2 | $YBaInO_4$ | | |
| Example 2-3 | $HoBaInO_4$ | | |
| Example 2-4 | $ErBaInO_4$ | −5.60 at 801° C. | |
| Example 2-5 | $YbBaInO_4$ | | |
| Example 2-6 | $Y_{0.97}BaInO_{3.955}$ | −5.10 at 797° C. | −5.10 at 957° C. |
| Example 3-1 | $Nd_{0.9}La_{0.1}BaInO_4$ | −3.66 at 795° C. | −4.68 at 852° C. |
| Example 3-2 | $Nd_{0.8}La_{0.2}BaInO_4$ | −3.55 at 795° C. | |
| Example 3-3 | $Nd_{0.9}Pr_{0.1}BaInO_4$ | −3.48 at 796° C. | −4.77 at 851° C. |
| Example 3-4 | $Nd_{0.8}Pr_{0.2}BaInO_4$ | −3.78 at 797° C. | |
| Example 3-5 | $Nd_{0.9}Sr_{0.1}BaInO_{3.95}$ | −2.20 at 801° C. | |
| Example 3-6 | $Nd_{0.8}Sr_{0.1}Ba_{1.1}InO_{3.9}$ | −2.12 at 863° C. | |
| Example 3-7 | $Nd_{0.8}Sr_{0.2}BaInO_{3.9}$ | −2.682 at 795° C. | |
| Example 3-8 | $Nd_{0.7}Sr_{0.3}BaInO_{3.85}$ | −2.358 at 799° C. | |

TABLE 4

| | Ion | | | | | | | | | |
|---|---|---|---|---|---|---|---|---|---|---|
| | $Ba^{2+}$ | $Sr^{2+}$ | $La^{3+}$ | $Pr^{3+}$ | $Nd^{3+}$ | $Sm^{3+}$ | $Y^{3+}$ | $Ho^{3+}$ | $Er^{3+}$ | $Yb^{3+}$ |
| Ionic radius [Å] (Coordination number: 12) | 1.61 | 1.44 | 1.36 | 1.338 | 1.109 | 1.079 | 1.019 | 1.015 | 1.004 | 0.985 |

The perovskite related compounds of the present invention are available for solid oxide fuel cells, sensors, batteries, electrodes, electrolytes, oxygen concentrators, oxygen separation membranes, oxygen permeable membranes, catalysts, photocatalysts, electric devices, electronic devices, communication devices, devices used in energy and environmental industries, and optical apparatuses.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A perovskite related compound with a layered structure in which a perovskite- and an A-rare earth structure units are alternately arranged,
wherein reduced cell parameters $a_r$-$c_r$ and $\alpha_r$-$\gamma_r$ and a reduced cell volume $V_r$ are within below-shown ranges:
(Reduced cell parameters)
$a_r$=6.05±0.6 Å,
$b_r$=8.26±0.8 Å,
$c_r$=9.10±0.9 Å,
$\alpha_r$=103.4±10°,
$\beta_r$=90±10°,
$\gamma_r$=90±10°, and
$V_r$=442.37±67 Å$^3$, where: $a_r$, $b_r$, and $c_r$ are a-, b-, and c-axis lengths, respectively, of a reduced cell, $\alpha_r$ is an angle between the b- and c-axes of the reduced cell, $\beta_r$ is an angle between the a- and c-axes of the reduced cell, and $\gamma_r$ is an angle between the a- and b-axes of the reduced cell, and wherein at least one of the reduced cell parameters $a_r$-$c_r$ can be 0.5 times, 2 times or 3 times as large as the aforementioned value, and the values of $a_r$, $b_r$ and $c_r$ can be replaced with one another, or the values of $\alpha_r$, $\beta_r$, and $\gamma_r$ can be replaced with one another.

2. The perovskite related compound according to claim 1, expressed by a below-shown general formula (I):

$$A_x A'_y B X_z \qquad (1)$$

where: A is a cation at an A site and is at least one of a cation with coordination number from 6 to 9 with X, A' is a cation at an A' site and is at least one of a cation with the coordination number 30 from 9 to 12 with X, the average ionic radius and/or the average valence of A is different from those of A, B is a cation at a B site and is at least one of a cation with the coordination number of 6 with X, these coordination numbers of A, A' and B are coordination numbers where there are no anion vacancies, X consists of at least one anion, x+y is a value in a range of 2±1, and z is a value in a range of 4±0.8.

3. The perovskite related compound according to claim 2, wherein an average ionic radius of A' is larger than that of A.

4. The perovskite related compound according to claim 3, wherein

A includes a cation of at least one element, selected from the group consisting of Li, Na, Mg, K, Ca, Sc, Mn, Fe, Co, Cu, Zn, Rb, Sr, Y, Mo, Tc, Cd, In Te, Cs, Ba, La, Ce, Pr, Nd, Pm, Sm, Eu, Gd, Tb, Dy, Ho, Er, Tm, Yb, Lu, Hf, W, Hg, Tl, Pb, Bi, Po, Ra, Th, Pa, U, Np and Pu, A' includes a cation of at least one element, selected from the group consisting of Li, Na, Mg, K, Ca, Sc, Mn, Fe, Co, Cu, Zn, Rb, Sr, Y, Mo, Tc, Cd, In, Te, Cs, Ba, La, Ce, Pr, Nd, Pm, Sm, Eu, Gd, Tb, Dy, Ho, Er, Tm, Yb, Lu, Hf, W, Hg, Tl, Pb, Bi, Po, Ra, Th, Pa, U, Np and Pu, and has an average ionic radius larger than that of A, B includes a cation of at least one element, selected from the group consisting of Li, Be, Mg, Al, Si, P, Sc, Ti, V, Cr, Mn, Fe, Co, Ni, Cu, Zn, Ga, Ge, As, Se, Y, Zr, Nb, Mo, Tc, Ru, Rh, Pd, Ag, Cd, In, Sn, Sb, Te, Ce, Pr, Pm, Sm, Eu, Gd, Tb, Dy, Ho, Er, Tm, Yb, Lu, Hf, Ta, W, Re, Os, Ir, Pt, Au, Tl, Pb, Bi, Po, At, Th, Pa, U, Np and Pu, and X includes an anion of at least one element, selected from the group consisting of N, O, F, S, Cl, Se, Br, Te and I.

5. The perovskite related compound according to claim 4, wherein

A includes ions of at least one of a rare-earth elements,

A' includes ions of at least one of a group-2 elements, and

B includes ions of at least one of a group-13 elements.

6. The perovskite related compound according to claim 5, wherein

A includes ions of at least one of elements selected form the group consisting of Y, La, Pr, Nd, Sm, Ho, Er and Yb, A' includes at least a Ba ion and/or an Sr ion, B includes at least an In ion, and X includes at least an oxide ion.

7. A perovskite related compound with a layered structure in which a perovskite- and an A-rare earth structure units are alternately arranged, wherein reduced cell parameters $a_r$-$c_r$ and $\alpha_r$-$\gamma_r$ and a reduced cell volume $V_r$ are within below-shown ranges:

(Reduced cell parameters)

$a_r$=6.05±0.6 Å, $b_r$=8.26+0.8 Å, $c_r$=9.10±0.9 Å, $\alpha_r$=103.4±10°, $\beta_r$=90±10°, $\gamma_r$=90±10°, and $V_r$=442.37±67 Å³, where: $a_r$, $b_r$, and $c_r$ are a-, b-, and c-axis lengths, respectively, of a reduced cell, $\alpha_r$ is an angle between the b- and c-axes of the reduced cell, $\beta_r$ is an angle between the a- and c-axes of the reduced cell, and $\gamma_r$ is an angle between the a- and b-axes of the reduced cell, wherein at least one of the reduced cell parameters $a_r$-$c_r$ can be 0.5 times, 2 times or 3 times as large as the aforementioned value, and the values of $a_r$, $b_r$ and $c_r$ can be replaced with one another, or the values of $\alpha_r$, $\beta_r$, and $\gamma_r$ can be replaced with one another, and wherein the perovskite related compound includes a space group P2$_1$/c with a monoclinic system.

* * * * *